United States Patent
Behm et al.

(10) Patent No.: US 9,217,233 B2
(45) Date of Patent: Dec. 22, 2015

(54) ADJUSTABLE WEIR FOR HYDROELECTRIC DAM INSTALLATIONS

(71) Applicants: Hans Christian Behm, Bowen Island (CA); Gerald Michael Stout, Hudson Hope (CA)

(72) Inventors: Hans Christian Behm, Bowen Island (CA); Gerald Michael Stout, Hudson Hope (CA)

(73) Assignees: Hans Christian Behm, Bowen Island, British Columbia (CA); Gerald Michael Stout, Hudson Hope, British Columbia (CA)

( * ) Notice: Subject to any disclaimer, the term of this patent is extended or adjusted under 35 U.S.C. 154(b) by 15 days.

(21) Appl. No.: 14/026,061

(22) Filed: Sep. 13, 2013

(65) Prior Publication Data

US 2014/0018963 A1    Jan. 16, 2014

Related U.S. Application Data

(63) Continuation of application No. 12/306,521, filed as application No. PCT/CA2007/001114 on Jun. 20, 2007, now abandoned.

(60) Provisional application No. 60/815,850, filed on Jun. 23, 2006.

(51) Int. Cl.
| | |
|---|---|
| *E02B 8/06* | (2006.01) |
| *E02B 9/02* | (2006.01) |
| *E02B 9/06* | (2006.01) |
| *F03B 13/08* | (2006.01) |
| *G05D 9/12* | (2006.01) |

(52) U.S. Cl.
CPC . *E02B 9/025* (2013.01); *E02B 9/06* (2013.01); *F03B 13/086* (2013.01); *G05D 9/12* (2013.01); *Y02E 10/22* (2013.01); *Y02E 10/32* (2013.01)

(58) Field of Classification Search
CPC ............. E02B 9/06; E02B 9/025; E02B 9/12; E02B 3/108; E02B 7/005; F03B 13/086; G05D 9/12; Y02E 10/22; Y02E 10/32
USPC ........... 405/77, 78, 80, 87, 89, 107, 108, 110; 137/236.1
See application file for complete search history.

(56) References Cited

U.S. PATENT DOCUMENTS

| | | | | |
|---|---|---|---|---|
| 4,167,358 | A | * | 9/1979 | Besha .............................. 405/87 |
| 5,462,657 | A | * | 10/1995 | Rizk et al. ................ 210/170.06 |
| 5,988,946 | A | * | 11/1999 | Reed .............................. 405/115 |
| 6,354,762 | B1 | * | 3/2002 | Muramatsu ................... 405/115 |

FOREIGN PATENT DOCUMENTS

GB             700320         * 11/1953

* cited by examiner

*Primary Examiner* — Tara M. Pinnock
(74) *Attorney, Agent, or Firm* — Gowling Lafleur Henderson LLP

(57) ABSTRACT

A system for controllably adjusting spent water levels in the tailrace pool area of a hydroelectric power-generating dam installed into a waterway. The system comprises: (a) a controllably adjustable weir device installed into a downstream portion of the waterway adjacent a distal end of the tailrace pool area. The controllably adjustable weir device is configured for controllably impeding the egress of spent water from the tailrace pool area, (b) an apparatus provided with operative components configured for manipulating the controllably adjustable weir device to controllably increase and decrease the impediment therewith of spent water egress from the tailrace pool area. The operative components are serviceable from above the spent water, and (c) a control device configured for communicating and cooperating with the apparatus for manipulating the controllably adjustable weir therewith. The controllably adjustable weir device may be optionally installed into an excavation provided downstream adjacent to the tailrace pool area.

14 Claims, 19 Drawing Sheets

ADJUSTABLE WEIR FOR HYDROELECTRIC DAM INSTALLATIONS

CROSS-REFERENCE TO RELATED APPLICATIONS

This application is a continuation of application Ser. No. 12/306,521 filed on Jan. 24, 2009, filed as application number PCT/CA2007/001114 on Jun. 20, 2007, which claims priority from U.S. Provisional application No. 60/815,850 filed Jun. 23, 2006.

TECHNICAL FIELD

This invention relates to dam installations for hydroelectric power generation. More particularly, this invention relates to controlling the flow of water through turbines in hydroelectric dam installations.

BACKGROUND ART

The driving power for a hydroelectric generation installation typically comprises a reservoir of water created by the construction of a dam across a river or other waterway system, at least one electric generator driven by a turbine receiving a channeled flow of headwater from the reservoir, and a downstream discharge system for egress of spent water from the turbine back into the river or waterway system. The amount of electricity generated in such installations is directly affected by the height of the water in the dam at the water intake stand pipe that feeds the penstock delivering the water to the turbine. In general terms, increasing the height of a dam during construction enables the installation of a taller water intake stand pipe thereby enabling the delivery of a taller column of water to the turbine. The bottom of the water column is typically defined by the bottom surface of the reservoir. It is the pressure caused by weight of the volume of water during its vertical drop from top to the bottom of the column that determines the force with which the turbine is driven. Turbines are commonly situated at or near the bottom of the water column. The vertical drop of water provided to the turbine is commonly referred to as the "head" of the dam. The water pressure delivered to the turbine can be manipulated by the diameters selected for the intake stand pipe and the penstock, and by the height at which the water inlets into the intake stand pipe are positioned relative to the turbine to which the water is delivered. Maintenance of adequate volumes of water in dam reservoirs is dependent on the rate of water flow in the upstream waterway feeding into the dam, and on the annual precipitation in the forms of rain, snow and snowmelt that supply water into the upstream waterway. Extended periods of peak power production are accompanied by high discharge volumes of spent water from the dam tailraces into the tailrace pools adjacent the dam often result in the downstream water levels in the tailrace pools rising above the levels of the turbine installation thereby directly causing a decrease in power production. Those skilled in these arts understand that the distance of the water column from the uppermost intake of the stand pipe to the downstream water level in the tailrace pool adjacent the dam, where backpressure becomes effective is known as the "net head" of the dam and that the "net head" is the primary determinant of the driving force delivered to the turbine and therefore, the height of the "net head" directly affects hydroelectric power generation. Multiple vertically positioned water inlets are provided on individual stand pipes to enable delivery of water to the turbine when the water level in reservoir drops during periods of extended dry and/or drought conditions. However, it is known by those skilled in these arts that the levels of impounded water maintained in a hydroelectric dam reservoir are directly affected by power production by the dam, i.e., by the rates of water removal from the reservoir and delivery to the turbines.

Another problem associated with hydroelectric power generation during periods of low power generation when the turbines are idling, or during extended dry or drought periods, is that reduction of water pressure into the turbine results in a lower volume of water egress from the tailrace into the downstream waterway. A common consequence is that the water levels in the downstream water decline to the point where a portion or all of the tailrace is exposed to the atmosphere thereby allowing air to ingress into the turbine via the tailrace infrastructure, predisposing the turbine to cavitation within the water delivery-egress infrastructure. The high-speed rotation of the turbine blades intermixes the air from the tailrace with the ingressing headwater from the reservoir causing a plurality of localized intense low-pressure regions (i.e., vacuum pressure) comprising air bubbles swirling about the turbine blades and shaft. The bubbles tend to collapse violently sending out shock waves that physically impact surround solid surfaces, initially causing minor damage in the form of pits and abrasions in the blade surfaces that over extended periods or episodes of cavitation, may increase in size to form voids within the blades and to cause fatigue in the materials used to configure the blades and the turbine shaft. Such damaged turbines must be replaced to prevent serious equipment malfunctions and breakdowns which may incapacitate the hydroelectric generating plant until repairs are made.

The prior art discloses several strategies for increasing the effective head of a dam without having to increase the height of the dam and for controlling the level of water in a tailrace in response to seasonal water flow fluctuations upstream of the dam. U.S. Pat. No. 4,014,173 discloses installing a generator-driving turbine in a water-tight pit that is substantially below the bed level of the tail water and continuously removing water discharged from the turbine by a self-energizing impulse pump known to those skilled in these arts as a hydraulic ram. The hydraulic ram is preferably installed in a second water-tight pit located downstream from the turbine pit and must be interconnected to the turbine pit by an underground piping infrastructure. The complex construction required by the '173 system not suitable for many landscapes which are suitable for installation of hydroelectric power generation stations; furthermore, this system is difficult to retrofit to existing hydroelectric generating installations. Furthermore, the design and the configuration of the turbine and hydraulic ram pits impose restrictions on ease-of-access for maintenance, repair and replacement work. GB 700,320 discloses an adjustable weir installed in the tailrace of a hydraulic turbine during construction of the hydroelectric generating dam for the purpose of maintaining a level of water in tailrace sufficiently high so as to prevent cavitation at the turbine. The adjustable weir is automatically controlled by a device responsive to the water level in the tailrace in such a manner that the weir is kept below and out of the flow of water egressing from the turbine as long as the water level does not drop below a pre-determined minimum level. If the water flow does drop below the minimum level, then the adjustable weir is raised to dam up the water in the tailrace thereby raising the water level above the minimum required to prevent cavitation. The '320 adjustable weir is designed to be continually submerged in the tailrace water flow and consequently is subject to numerous operational problems including: (1) propensity for failure of individual components of the adjustable weir or of the unit itself as a consequence of wear and corrosion from being continually submerged, (2) difficulty of access for under-water maintenance and repair, and (3) the '320 weir is not debris-tolerant, i.e., any back-washed bottom scour such as rocks, tree limbs and other water-logged debris will jam against the weir and interfere with its operation.

DISCLOSURE OF THE INVENTION

The exemplary embodiments of the present invention are directed to systems, apparatus and methods for controllably manipulating and/or adjusting and/or maintaining the upstream and/or levels in artificially lowered downstream tail race water courses in hydroelectric dam installations so that maximum achievable net heads may be maintained regardless of changes in upstream impounded water levels.

According to one exemplary embodiment of the present invention, there is provided a controllably adjustable weir device for installation into a downstream waterway communicating with a hydroelectric dam. The adjustable weir device is configured for retractably communicating with and engaging spent water discharged from the dam's tailrace(s). When in a fully retracted position, the adjustable weir device is in minimal communication with spent water discharged for the dam tailraces. It is preferable that, when in a fully retracted position, the weir device is not in communication with discharged spent water. When in a fully engaged position, the adjustable weir device directly impedes the downstream flow of discharged spent water thereby manipulably maintaining a selected water level adjacent the dam's tailrace(s). When in a partially engaged position, the adjustable weir device partially impedes and restricts the downstream flow of discharged spent water from the turbine tailrace(s).

According to one aspect, there is provided a controllably adjustable weir device approximate the distal end of the tailrace pool area of a hydroelectric dam. The adjustable weir device comprises at least one controllably inflatable-deflatable bladder tethered to at least one pair of supporting structures, said supporting structures engaging and cooperating with the bottom of the downstream waterway. A plurality of inflatable bladders may be conjoined by a tether to extend across a downstream waterway communicating with the tailraces of the hydroelectric dam, said plurality of bladders held in place by means of each bladder tethered to a pair of supporting structures. The at least one bladder is interconnected to and communicates with a controllable supply of compressed air provided for upon demand inflation and deflation. Alternatively, the adjustable weir device may comprise at least one controllably inflatable and deflatable assembly of conjoined bladder infrastructures contained within a supporting framework engaging and cooperating with the bottom surface of a downstream waterway. Alternatively, the adjustable weir device may comprise a plurality of conjoined bladder infrastructure assemblies contained within a supporting framework extending across the downstream waterway, said supporting framework cooperating with the opposing river banks. A controllable supply of compressed air is provided for on-demand inflation and deflation of the conjoined bladder infrastructure assemblies.

According to another aspect, there is provided a controllable adjustable weir device comprising a fixed-in-place construction of a concrete barrier wall extending across the downstream waterway. The concrete barrier wall is provided with a plurality of spaced-apart open-ended voids therethrough, said voids configured for hinged and/or sliding installation of gates. The gates are configured for sealing engaging and disengaging the concrete barrier walls. At least one controlling device is provided for communicating and cooperating with said gates for controllably engaging and disengaging the gates from the concrete barrier wall.

According to another exemplary embodiment of the invention, there is provided a downstream excavation approximate the distal end of the tailrace pool area of a hydroelectric dam, for increasing the head of the dam. The proximal edge of the excavation is approximate the distal end of the tailrace pool area to preserve the structural integrity of the toe region of the dam base and the supporting terrestrial substrate underlying the dam base, said distance determinable by site-specific topography and geophysical attributes. The depth of the excavation is selectable, site-specific and additive to the height of the dam head thereby enabling delivery of increased water pressure from the upstream impounded water reservoir adjacent the dam, to the turbines for increased power generation capacity. In a suitable form, the excavation is extendible between and communicates with the opposing banks of the downstream waterway communicating with the hydroelectric dam. Alternatively, the excavation may be configured about the longitudinal axis of the downstream waterway and may not extend to the river banks. Alternatively, the excavation may communicate with one but not the other of the two opposing banks of the downstream waterway.

According to a suitable aspect, there is provided a method of precisely increasing the head of a hydroelectric dam by installing an excavation in the bed of a downstream waterway, said excavation approximate the distal end of the tailrace pool area of the dam. The height of the increased head is manipulable by selection of a suitable depth for the excavation determined by skilled person in this art, based on site-specific topography and geophsycial attributes According to yet another exemplary embodiment of the present invention, there is provided a controllably adjustable weir device as described herein interposed a downstream excavation as described herein approximate the toe region of a hydroelectric dam.

According to a further exemplary embodiment, there is provided a method for controlling the water level of discharged spent water adjacent the tailraces of a hydroelectric dam by increasing the controlled engagement of the adjustable weir device of the present invention with the spent water discharged downstream from the dam's tailraces as the flow rates of water into the upstream impounded water reservoir decline, and by decreasing the controlled engagement of the adjustable weir device when the upstream flow rates of water into the impounded water reservoir increase.

DESCRIPTION OF THE DRAWINGS

The present invention will be described in conjunction with reference to the following drawings, in which.

BEST MODES FOR CARRYING OUT THE INVENTION

Figure 1:
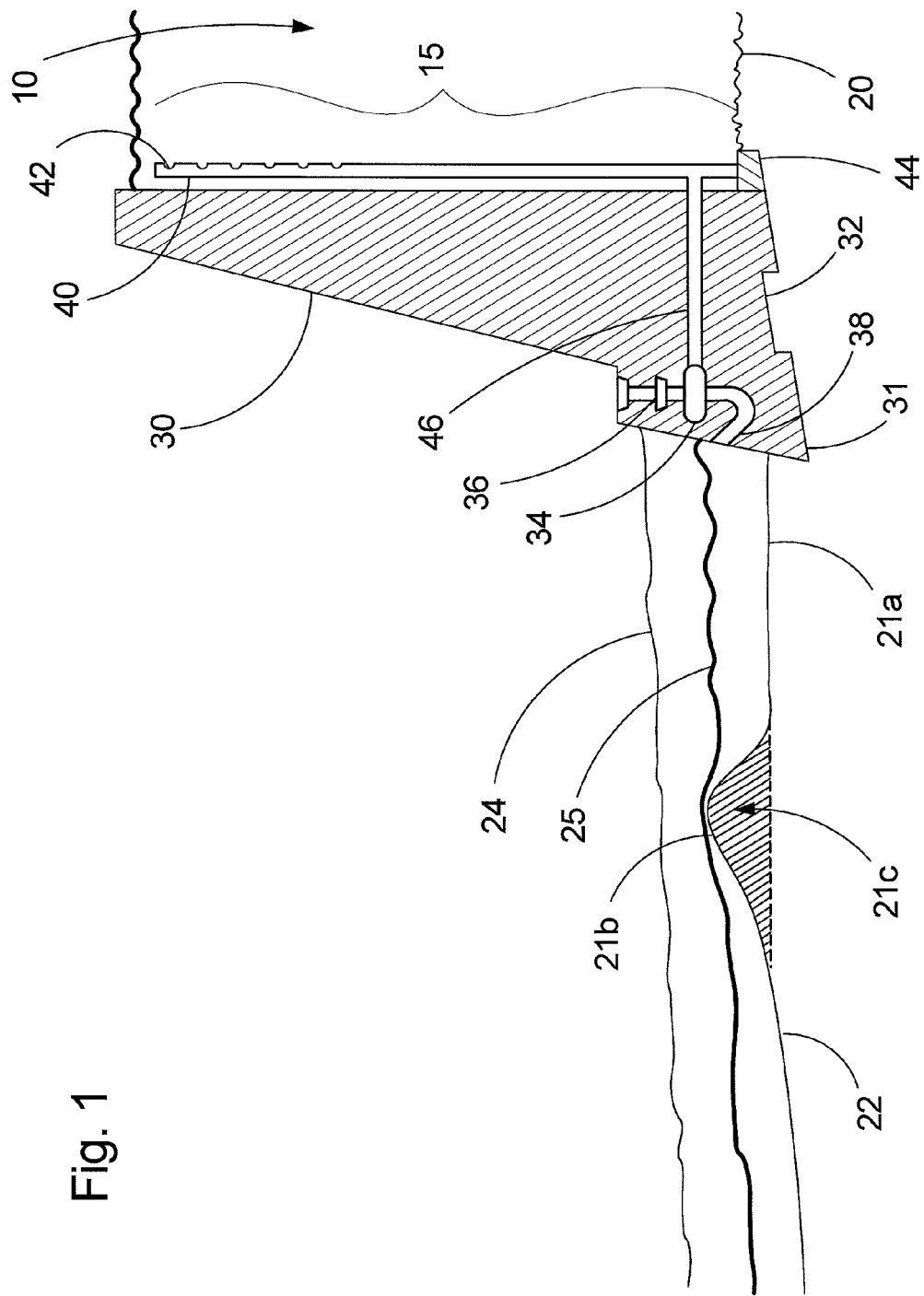
FIG. 1 is a cross-sectional side view of an exemplary prior art hydroelectric dam installation.

FIG. 1 illustrates an exemplary conventional hydroelectric power-generating installation comprising a dam structure 30 configured for retaining "impounded" water 10 in an upstream reservoir bed 20 and discharging spent water into a downstream waterway having a natural river bed 22 and opposing riverbanks 24. The downstream waterway typically comprises a tailrace pool 21a adjacent the dam 30 provided with at its distal end, a fixed-in-placed impediment 21b in the form of a berm comprising excavated fill materials 21c, that has the purpose of retaining spent water 25 released from the tailrace 38 t at a downstream surface level that keeps the outlets of tailrace 38 submerged. The bases of conventional dam designs typically are provided with a mid-point keyway 32 and a toe region 31 underneath the turbines for stability. The dam structure 30 is also typically provided with a support 44 for a stand pipe 40 configured with at least one intake aperture 42 for receiving water from the reservoir 10 and transferring said water to a penstock 46 wherein it is conveyed to a turbine 34 configured to drive an electricity-producing generator 36. Spent water is discharged from the turbine 34 into a tailrace 38 which discharges the spent water from the dam 30 into the downstream waterway defined by the riverbanks 24. The height of the water column 15 contained within the stand pipe 40 between the uppermost intake 42 and the turbine 34 is commonly referred to as the "head" of the impounded water 10. The height of the water column 15 contained within the stand pipe 40 between the uppermost intake 42 and the tailrace 38 is commonly referred to as the "effective net head" of the impounded water 10. The weight of the water within the stand pipe 40 provides the pressure to drive the turbine 34. The portion of the water column interposed the uppermost water inlet 42 and the spent downstream water level 25 is the "net head". Increasing the effective net head, i.e., the height of the water column 15 from its surface level in the stand pipe 40 to the outlet of the tailrace 38 will increase the water pressure delivered to the turbine 34 thereby increasing power generation by the generator 36. Increasing the net head in most conventional installations can only be accomplished by increasing the height of the dam structure 30 thereby raising the level of the impounded water 10. However, this approach is usually not practical or physically possible.

In order to avoid cavitation in the turbines during low-water flow conditions caused by extended periods of dry conditions and/or drought that result in declining upstream and downstream water levels, conventional dam designs place the tailrace discharge outlets 38 from the dam 30 as close as possible to the tailrace pool bottom 21a in order to: (1) keep the turbines 36 flooded with water, and (2) provide maximum net head. The construction of the fixed-in-place impediment 21b with excavated materials 21c to form the tailrace pool 21a increases the surface level 25 of the spent water retained in the tailrace pool 21a to keep the outlets of the tailrace 38 submerged.

The consequence during periods of high water flow rates caused by maximum power production or during periods of excessive precipitation and/or snow melt, is that the downstream water levels 25 may increase considerably above top of the fixed-in-place impediment 21b with the result that the that net head decreases to the distance between the uppermost water inlet 42 and the downstream water level 25, i.e., instead of the distance between the uppermost water inlet 42 and the turbine 34. In this situation, the decrease in the net head causes a directly proportional decrease in power production by the generator 36 driven by turbine 34.

The consequence during periods of low water flow rates through the turbine 34 as a consequence of turbine idling during periods of low power production demand or alternatively, during extended periods of drought, is that the downstream water level 25 retained in the tailrace pool 21a may drop significantly thereby exposing the outlet of the tailrace and facilitating the occurrence of cavitation.

Exemplary embodiments of the present invention provide systems, apparatus and methods for maximizing the effective net heads of hydroelectric dam installations and for controllably manipulating the downstream levels of discharged water adjacent dam installations in response to reduced volume discharges of spent water into the tailrace pool due to lower power production or during turbine idling, and/or to environmental changes in volumes of water delivered into reservoirs configured for storing impounded water. During periods of high power production and/or during periods of high water flow rates into impounded water reservoirs, the exemplary embodiments cooperate to maintain the "effective net head" of the head and to efficiently remove discharged spent water from the dam thereby maintaining the optimum height of the "effective net head". During periods of low water flow rates through turbines 34, the exemplary embodiments cooperatingly manipulated to maintain a selected downstream water level adjacent the tailrace outlets of the dam to remove the potential for cavitation at the turbines caused by air backing into turbine chambers through the tailrace outlets and while yet maintaining the optimum height of the "effective net head".

Figure 2:
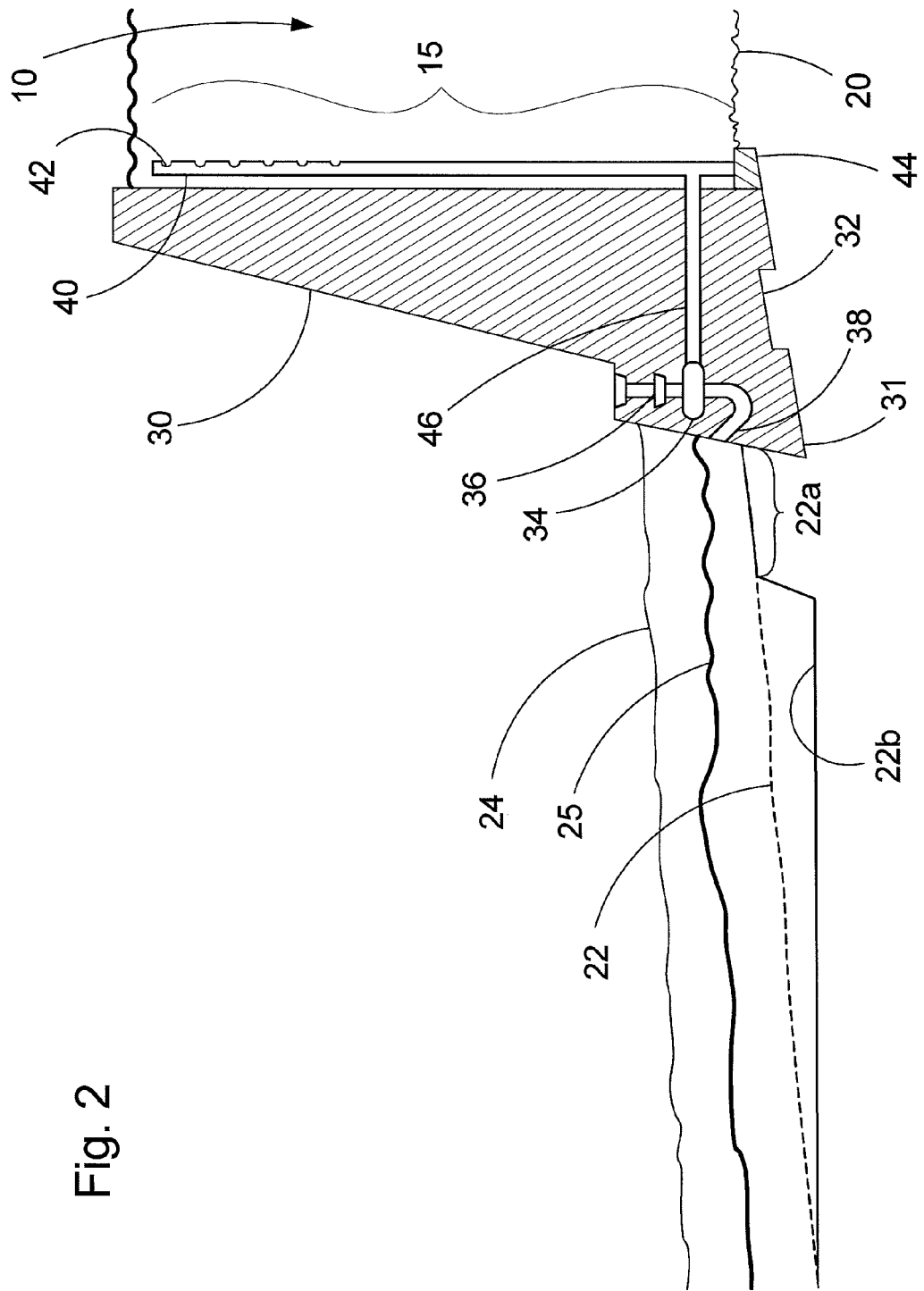
FIG. 2 is a cross-sectional side view of the hydroelectric dam installation from FIG. 1, shown provided with an exemplary embodiment of the present invention.
Figure 3:
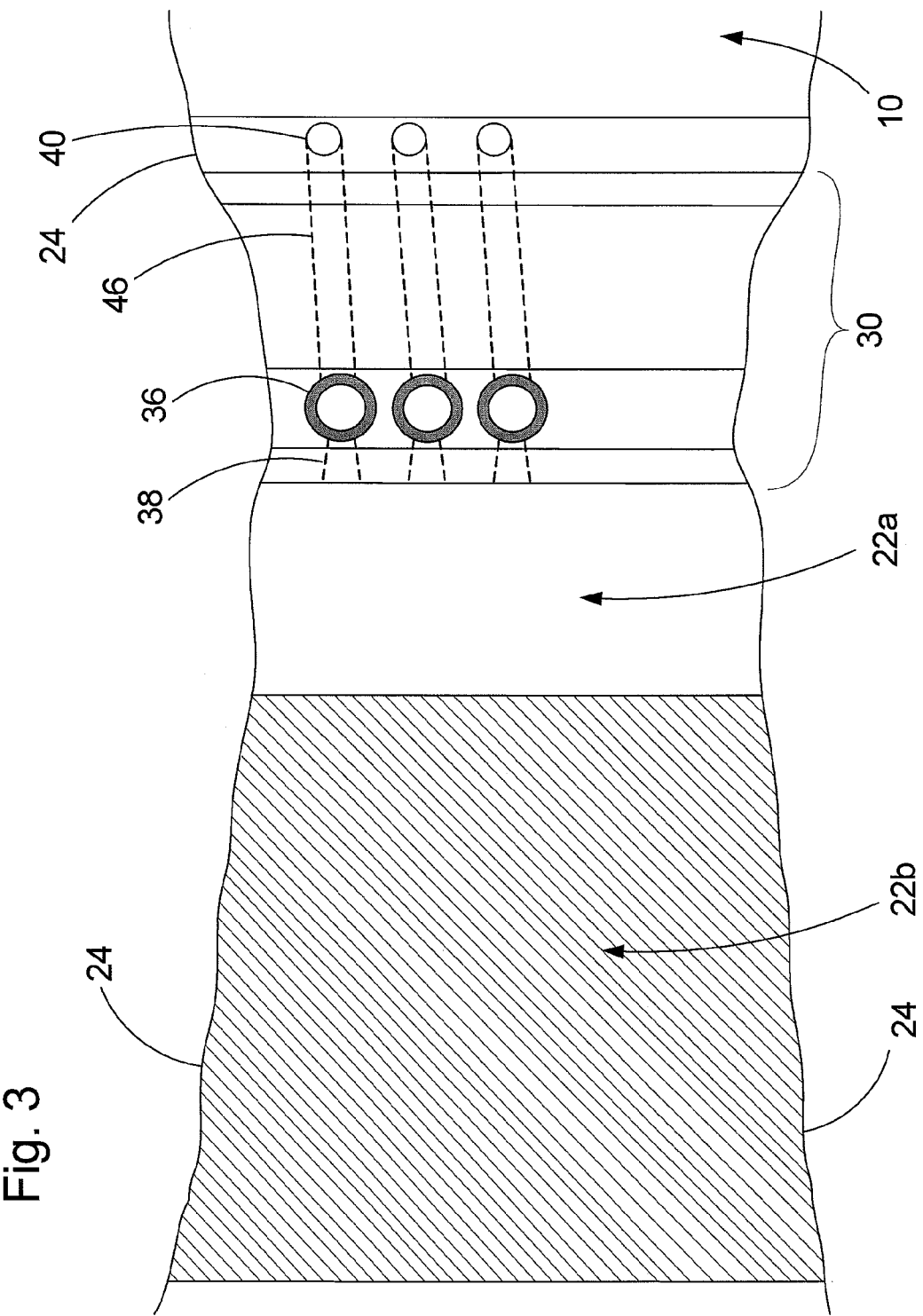
FIG. 3 is a plan view of the hydroelectric dam installation shown in FIG. 2.
Figure 4:
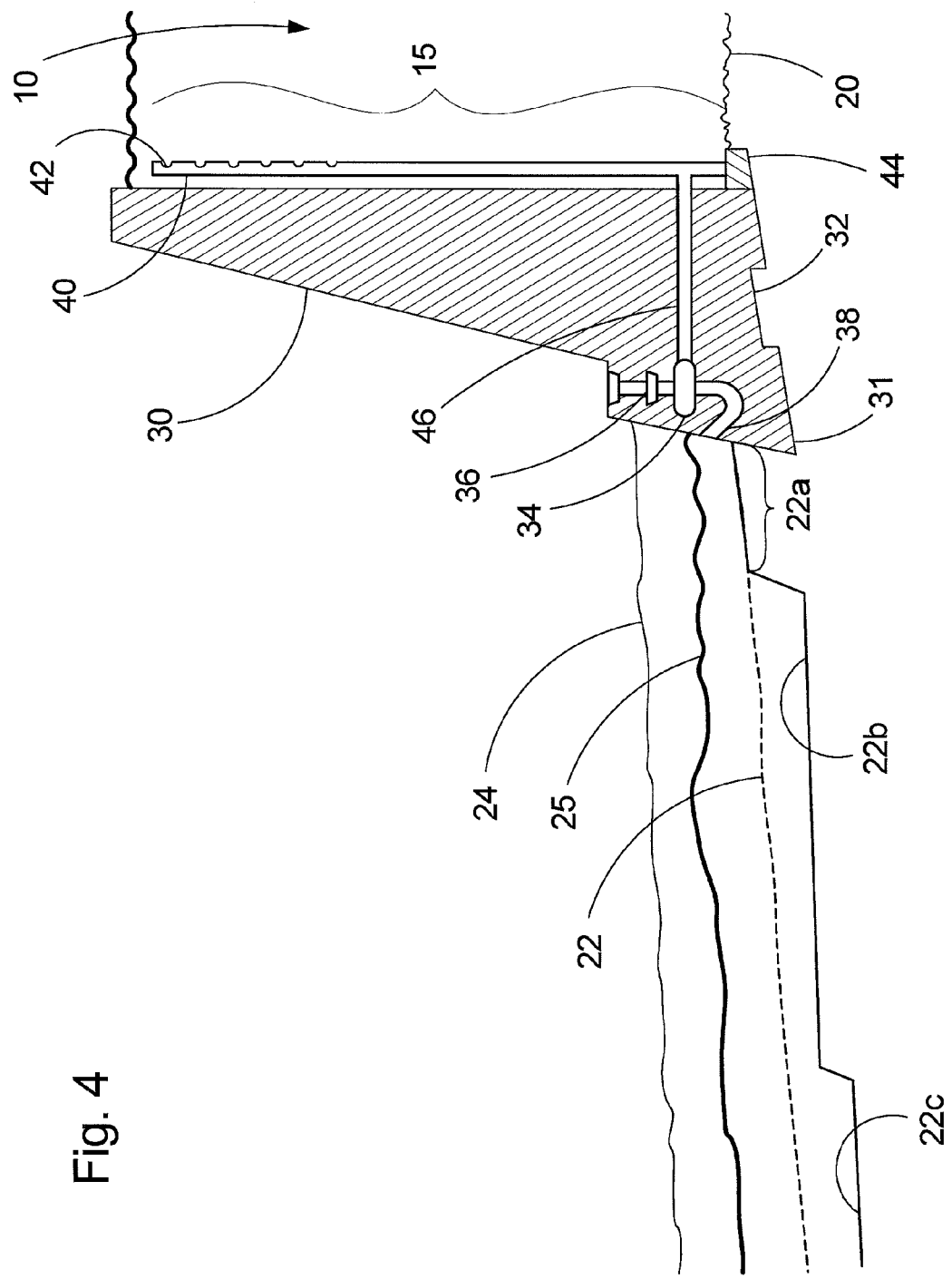
FIG. 4 is a cross-sectional side view of the hydroelectric dam installation from FIG. 2, shown provided with an alternative exemplary embodiment of the present invention.

Certain exemplary embodiments of the present invention provide combinations of downstream excavations and adjustable weir devices suitably placed within the excavations downstream from, but proximate, the tailrace pool areas of hydroelectric dam installations. As shown in FIGS. 2 and 3, a constructed berm (not shown) defining the distal end of a tailrace pool area 22a, may be removed from an existing hydroelectric dam installation and replaced with a suitable excavation 22b adjacent to the tailrace pool area 22a. The excavation 22b extends downstream for a suitable distance before conjoining the natural river bottom. The purpose of the excavation 22b is to provide a longer vertical distance of spent water to fall from the tailrace 38 and the tailrace pool area 22a, therefore increasing the "effective net head". If so desired due to the topography of the downstream riverbed, additional excavations, exemplified by excavation 22c in FIG. 4, maybe installed downstream adjacent to the first excavation 22b in order to maintain and extend positive egress of spent water 25 from the tailrace pool area 22a further downstream thereby providing a gravitational means for ensuring high rates of water flow through the turbines of a hydroelectric dam during seasonal periods when impounded water 10 levels significantly decline.

In conjunction with subsequent and/or deeper excavations provided adjacent the tailrace pool area, exemplary embodiments of the present invention also provide at least one adjustable weir device and optionally, a plurality of adjustable weir devices for installation into the excavations as exemplified in FIGS. 5-14. The adjustable weir devices are configured for controllably engaging and communicating with the spent water discharged from the dam's tailrace(s). During periods of high rates of water flow through the dam installation, e.g., during spring run-off conditions and/or upstream flood control conditions, the adjustable weir devices are manipulably controllable to provide minimal resistance to spent water 25 flowing out of the tailraces 38 into the tailrace pool areas 22a so that the spent water 25 moves downstream from the dam as quickly as possible. As the rates of impounded water flow through the turbines decrease during seasonal changes, the adjustable weirs are manipulable to controllably provide resistance to the flow of spent water 25 out of the tailrace pool areas 22a, so that desired height levels of spent water 25 are maintained adjacent the tailraces 38 of the dam as the rates of water flow through the penstocks 46, turbines 34 and out of the tailraces 38 decline, thereby enabling means for controlling and preventing cavitation in the turbines 34.

Figure 5:
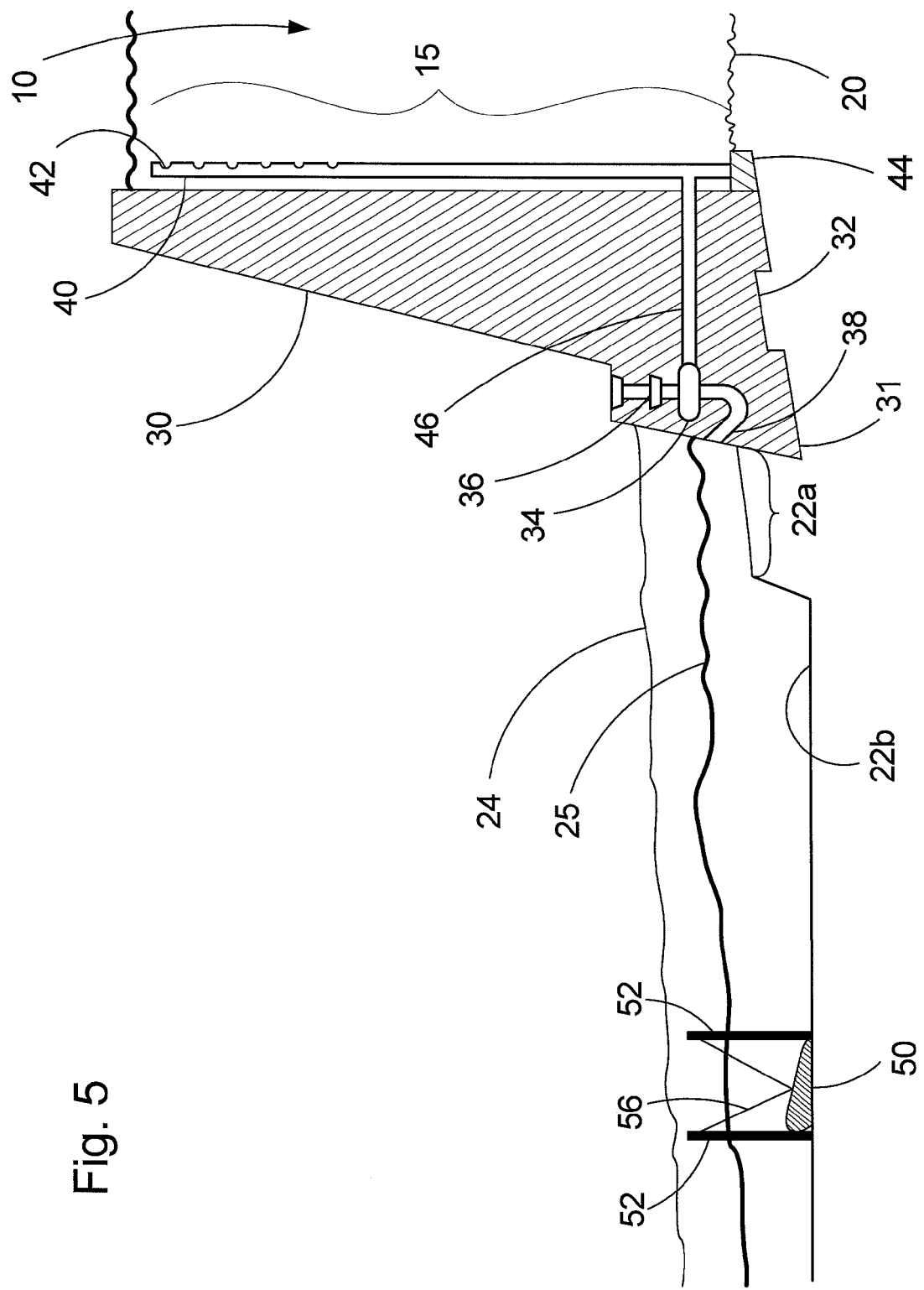
FIG. 5 is a cross-sectional side view of the hydroelectric dam installation from FIG. 2, shown provided with an exemplary embodiment of an inflatable weir according to the present invention, wherein the weir is shown in the deflated mode.
Figure 6:
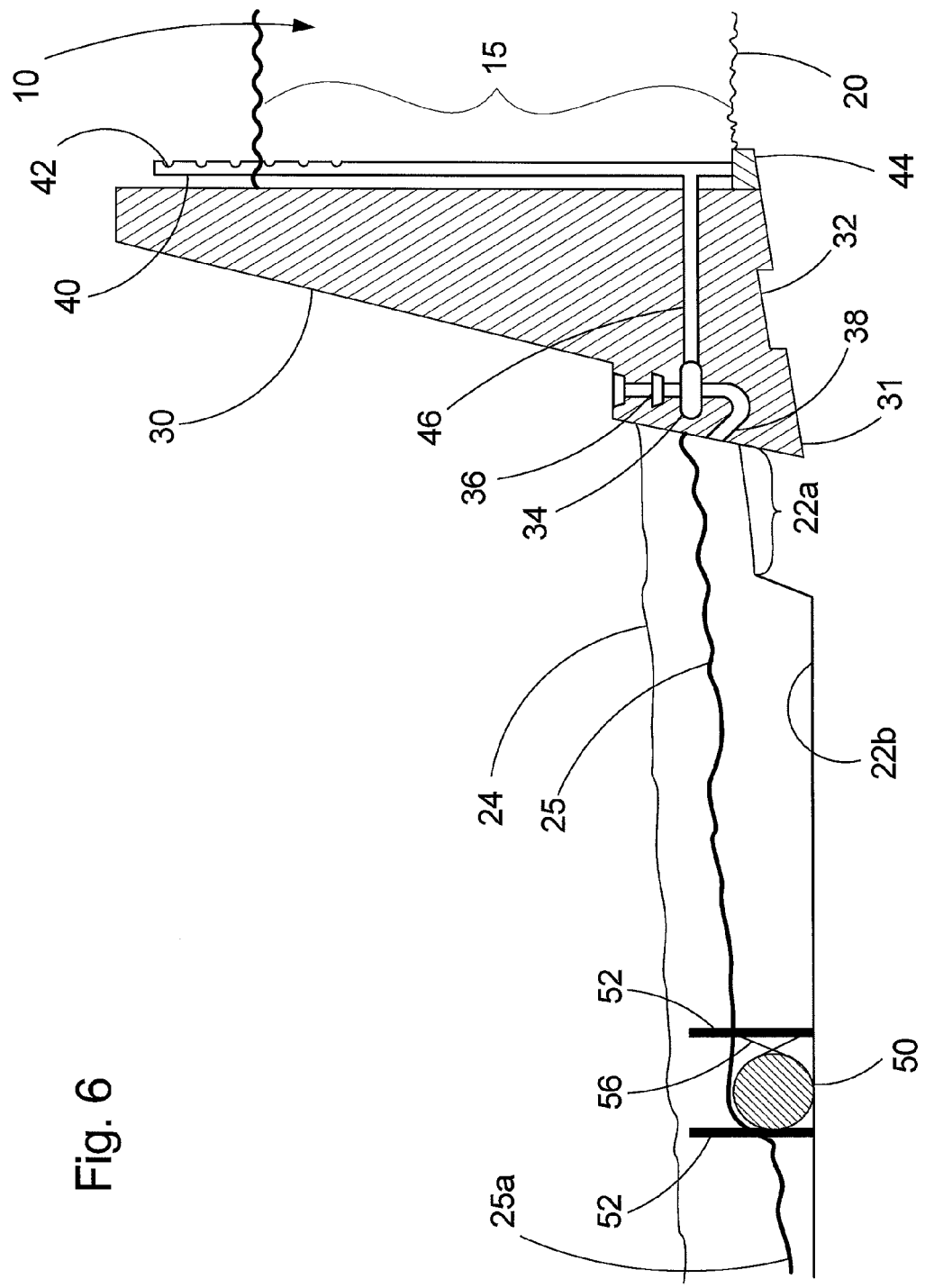
FIG. 6 is a cross-sectional side view of the hydroelectric dam installation from FIG. 5, shown with the weir in the inflated mode.
Figure 7:
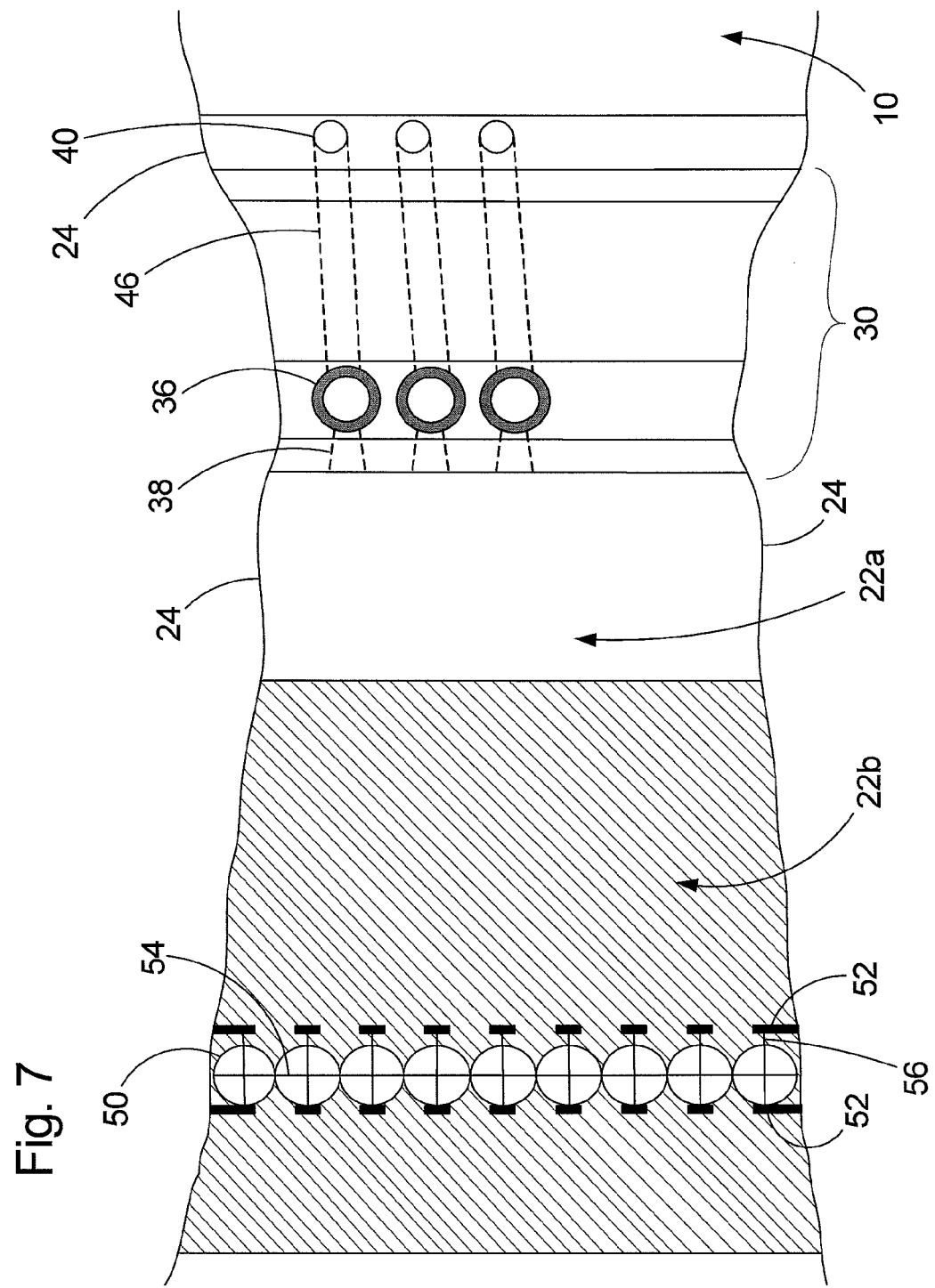
FIG. 7 is a plan view of the embodiment shown in FIG. 6.

The adjustable devices according to the present invention may comprise controllably inflatable and deflatable bladder devices. FIGS. 5 to 7 illustrate an exemplary embodiment comprising a plurality of inflatable bladders 50 conjoined by a tether 54 fastened to the opposite river banks 24, and configured to span, or alternatively partially cross, or alternatively sit mid river in the downstream water from the dam 30. Each inflatable bladder 50 is attached by tethers 56 to a pair of supports 52 that are securely mounted into the excavation 22b installed into the river bottom adjacent the tailrace pool 22a. During periods of high water flow rates into the impounded water reservoir 10, the bladders 50 are selectively and controllably deflated as shown in FIG. 5 to enable unrestricted flow of spent water 25 from the tailrace 38 into the tailrace pool 21a wherefrom it flows rapidly downstream. During extended dry periods as the rates of water flow continually decline, one or more bladders 50 are selectively and controllably inflated as shown in FIGS. 6 and 7 to create an increasingly elevated temporary impoundment for discharged spent water 25 adjacent the tailrace pool area 22a to maintain the water level 25 at a desired level sufficiently high to prevent air from backing into the turbine through the tailrace 38 thereby preventing the onset of cavitation. However, those skilled in these arts will understand that during conditions when impounded water 10 levels decline as exemplified in FIG. 6, the reduced level of spent water 25a downstream of the bladders 50, relative to the level of spent water 25 upstream to the bladders 50, will proportionally increase the "effective net head" and thereby facilitate increased power generation during such conditions.

Figure 8:
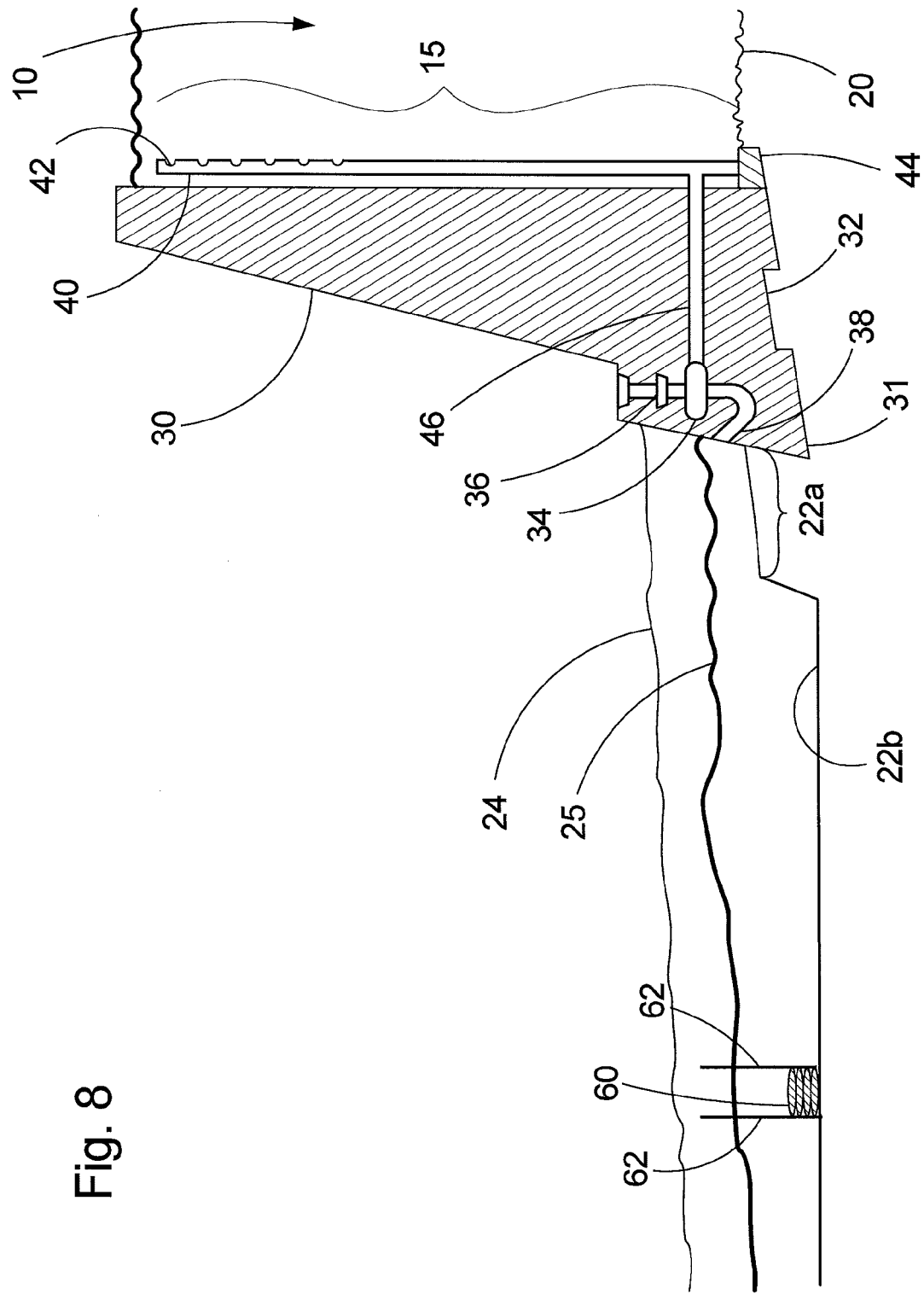
FIG. 8 is a cross-sectional side view of the hydroelectric dam installation from FIG. 2, shown provided with an alternative exemplary embodiment of an inflatable weir according to the present invention, wherein the weir is shown in the deflated mode.
Figure 9:
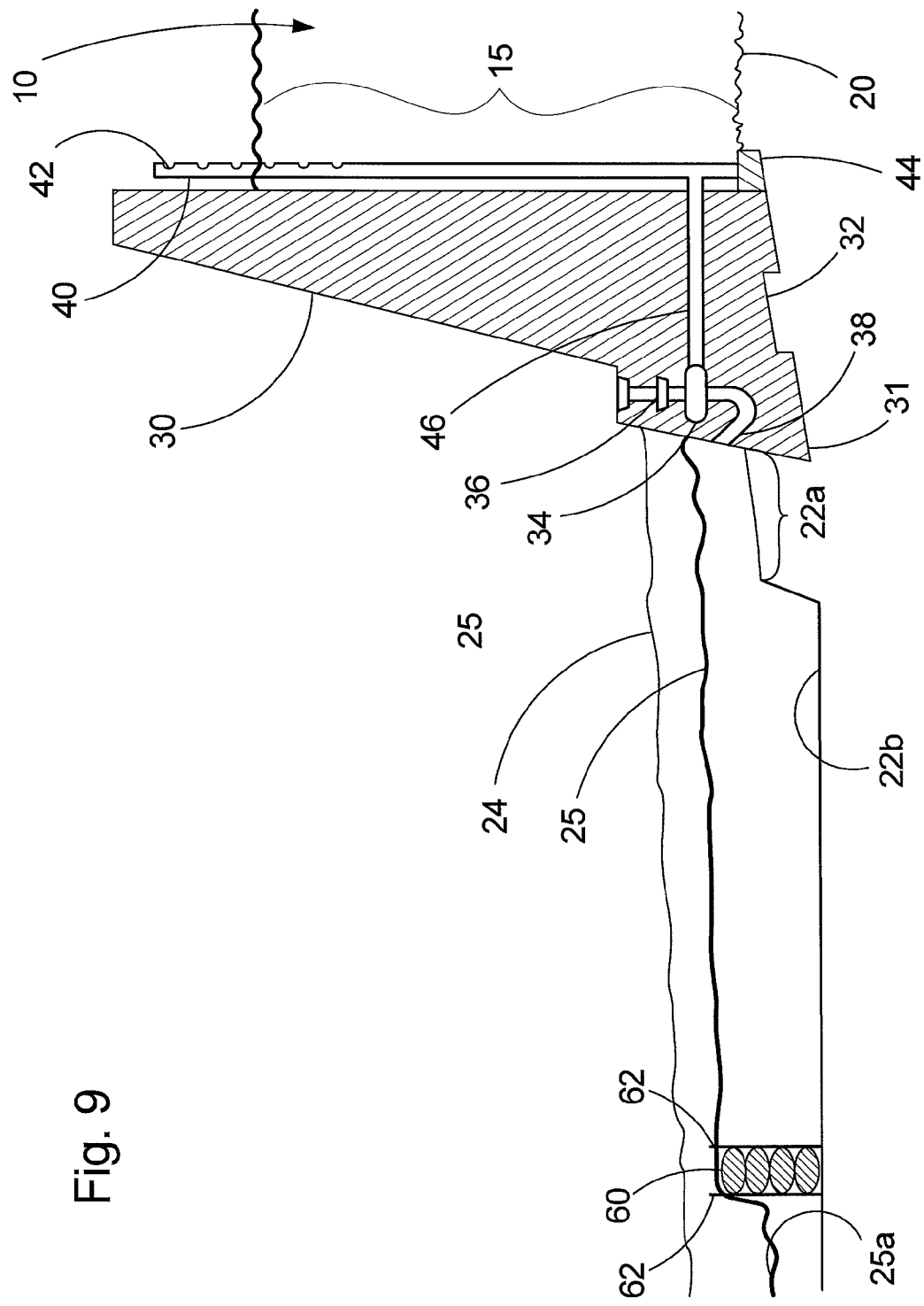
FIG. 9 is a cross-sectional side view of the hydroelectric dam installation from FIG. 5, shown with the weir in the inflated mode.
Figure 10:
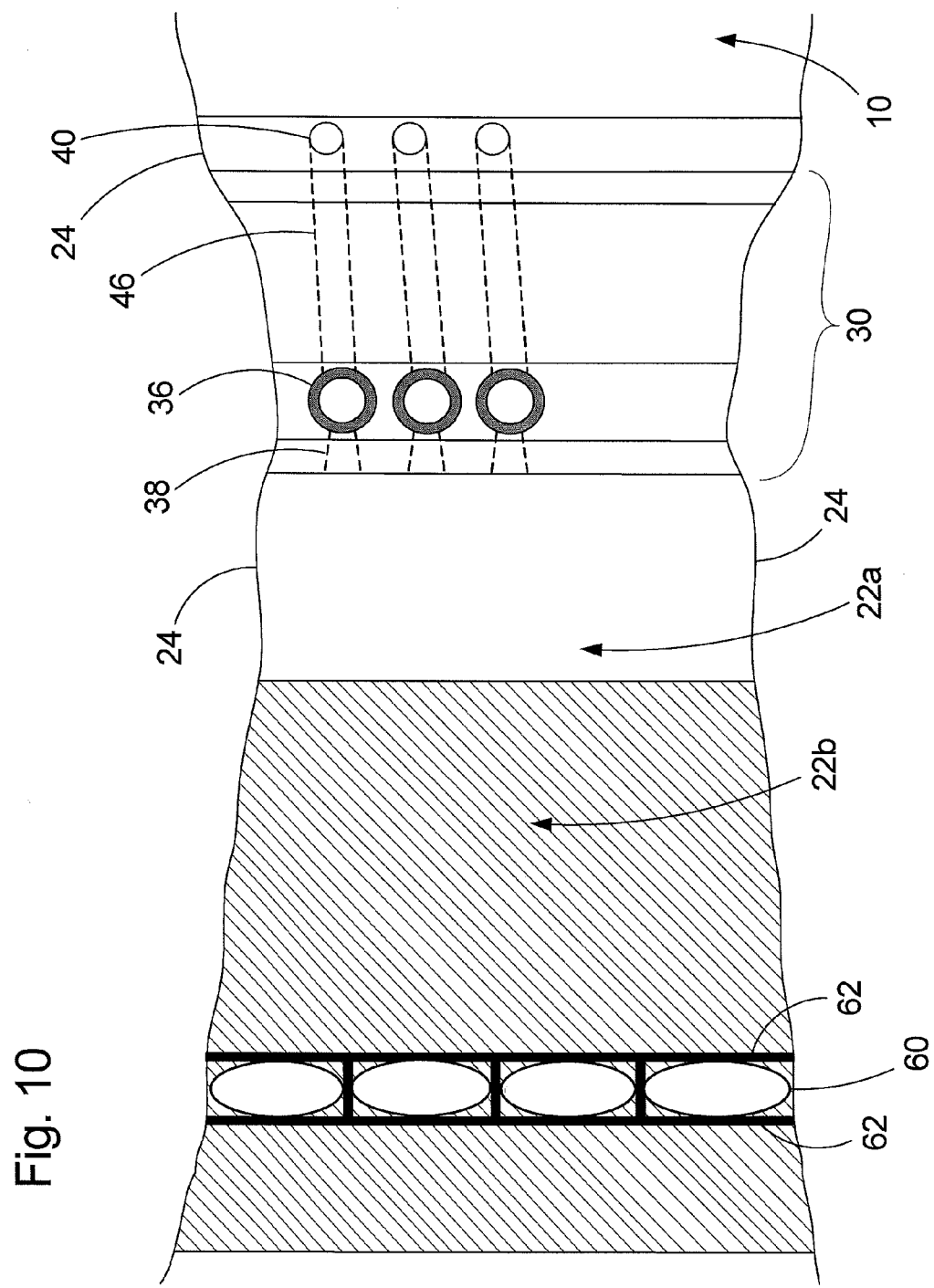
FIG. 10 is a plan view of the embodiment shown in FIG. 9.

FIGS. 8 to 10 illustrate another exemplary embodiment of the inflatable adjustable weir devices of the present invention comprising a plurality of conjoined bladder infrastructures 60 installed within a retaining framework 62 securely mounted into the excavation 22b installed into the river bottom adjacent the tailrace pool 22a, and configured to span a area downstream from the tailrace pool 22a. Each bladder infrastructure 60 is separately and independently inflatable and deflatable. During periods of high water flow rates into the impounded water reservoir 10, the bladder infrastructures 60 are deflated as shown in FIG. 8 to enable unrestricted flow of spent water 25 from the tailrace 38 into the tailrace pool 21a wherefrom it flows rapidly downstream 22. During extended dry periods as the rates of water flow continually decline, one or more bladder infrastructures 60 are inflated as shown in FIGS. 9 and 10 to create an increasingly elevated temporary impoundment for discharged spent water 25 adjacent the tailrace 38 to maintain the water level 25 sufficiently high in the tailrace pool area 22a to prevent air from backing into the turbine through the tailrace 38. Those skilled in these arts will understand that during conditions when impounded water 10 levels decline as exemplified in FIG. 9, the reduced level of spent water 25a downstream of the bladder infrastructures 60, relative to the level of spent water 25 upstream to the bladder infrastructures 60, will proportionally increase the "effective net head" and thereby facilitate increased power generation during such conditions.

Those skilled in these arts will understand that the exemplary bladders 50 and bladder infrastructures 60 can be controllably inflated and deflated by cooperation and communication with a compressed air supply. Those skilled in these arts will also understand that the compressed air equipment (not shown) can be installed in suitable housing structures on the shores of the waterway approximate the adjustable weir devices. Alternatively, the compressed air may be supplied from a dam utilities support facility by a piping infrastructure. It is suitable that the compressed air supply to the adjustable weir device is configured and installed above the predetermined downstream "high-water" levels for ease-of-access for repair and service work.

Figure 11:
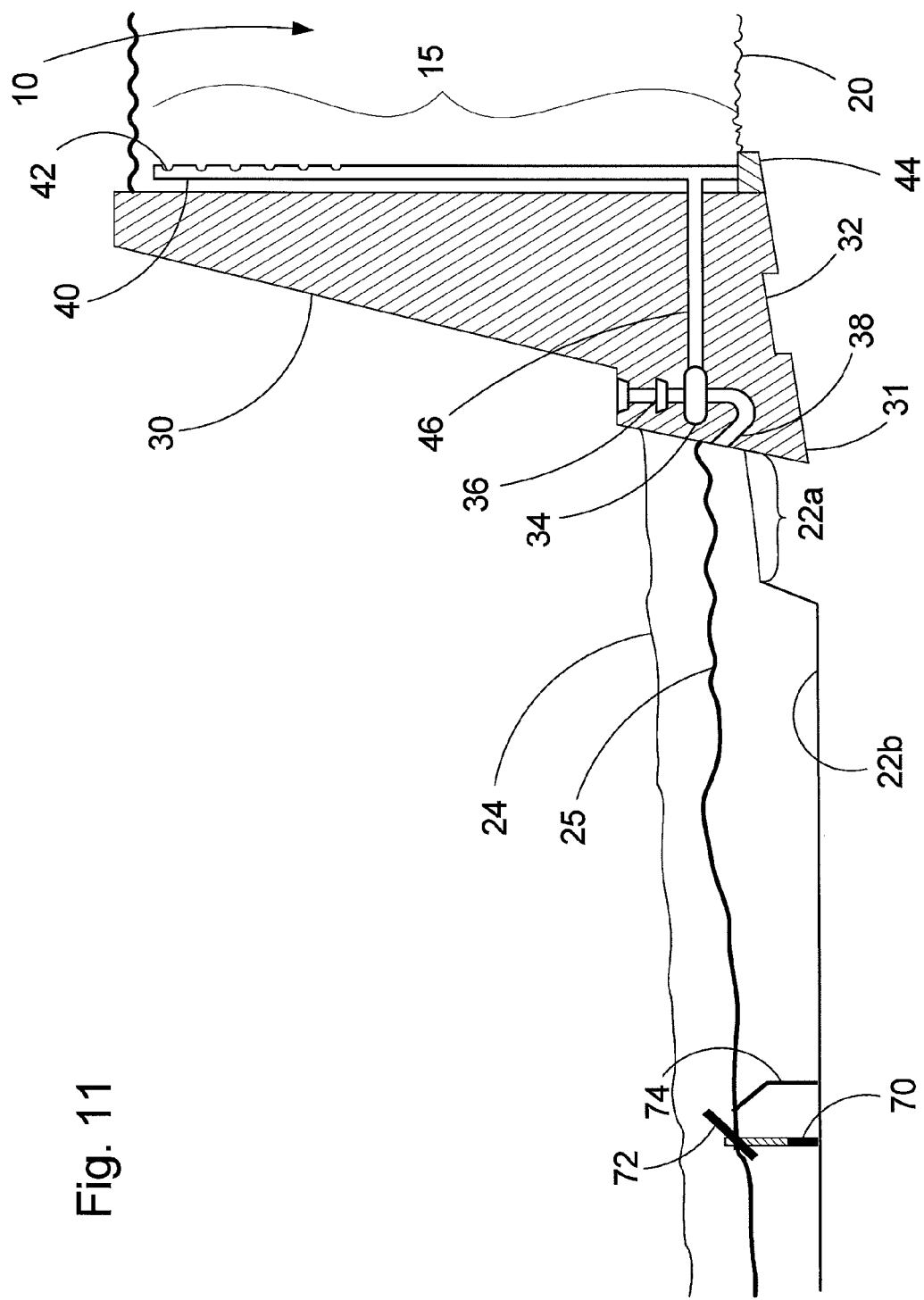
FIG. 11 is a cross-sectional side view of the hydroelectric dam installation from FIG. 2, shown provided with an exemplary embodiment of an adjustable multi-component weir according to the present invention, wherein the weir components are shown in an open position.
Figure 12:
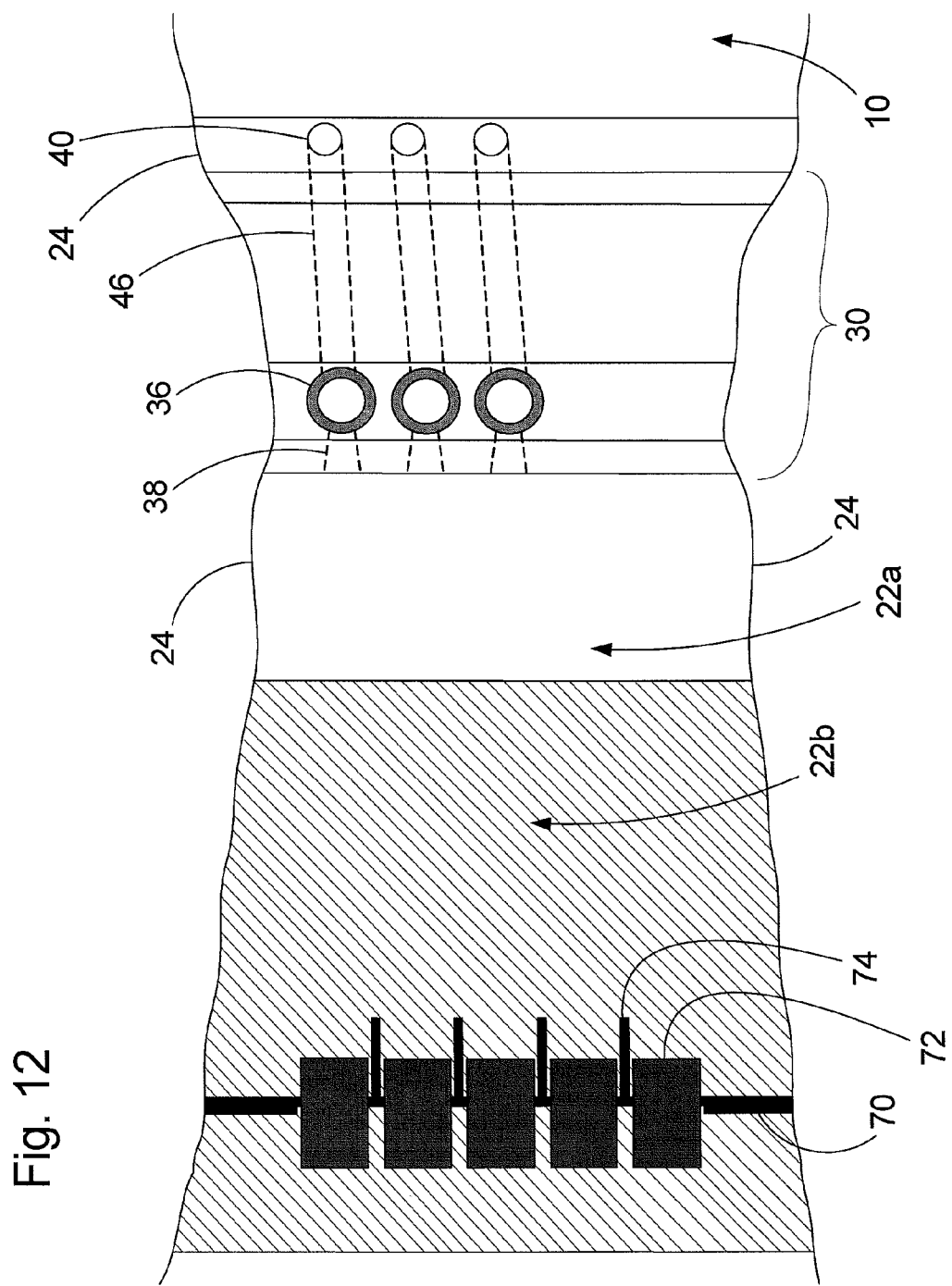
FIG. 12 is a plan view of the embodiment shown in FIG. 11.
Figure 13:
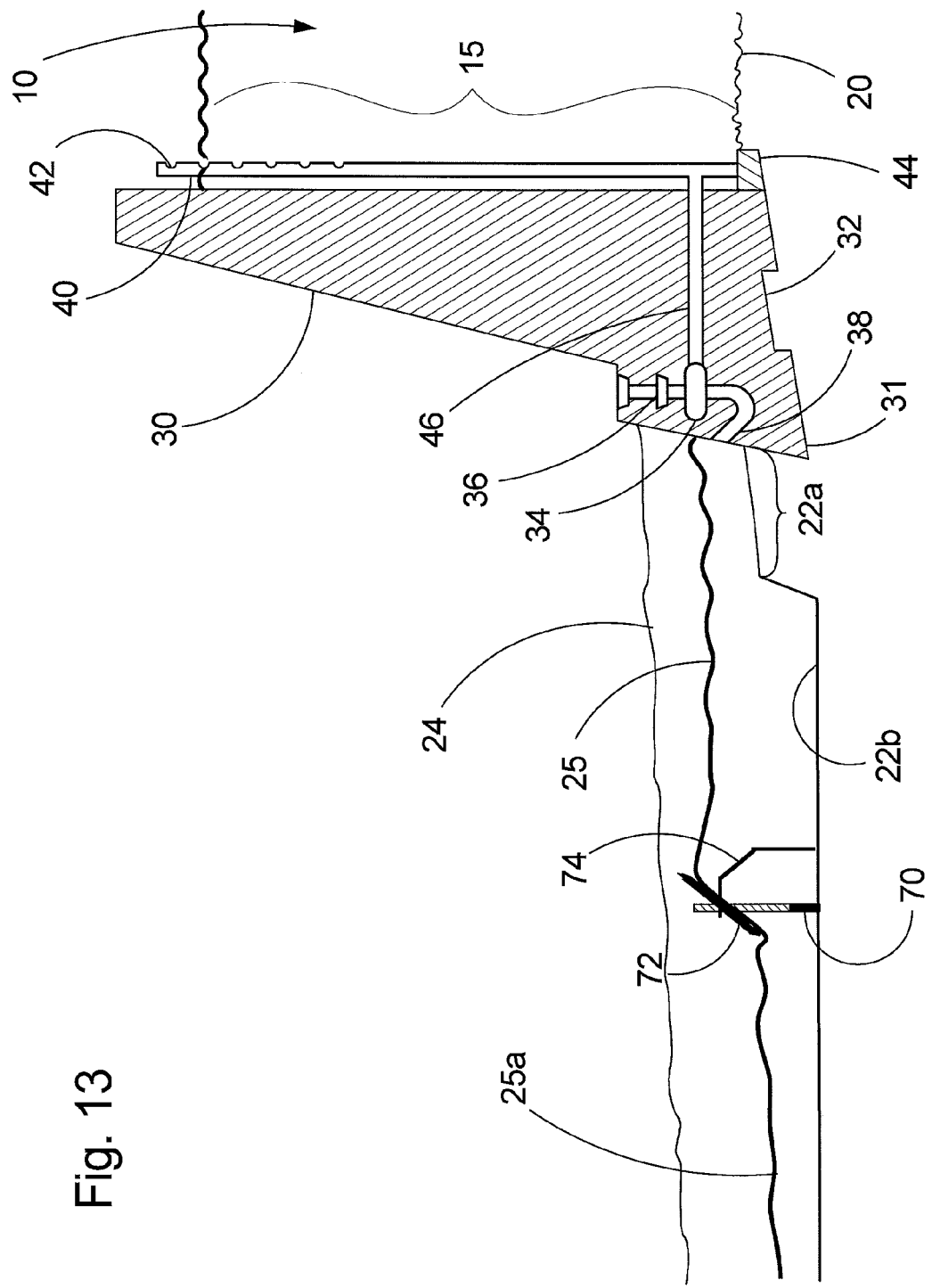
FIG. 13 is a cross-sectional side view of the hydroelectric dam installation from FIG. 2, shown provided with an exemplary embodiment of an adjustable multi-component weir according to the present invention, wherein the weir components are shown in a partially closed position.
Figure 14:
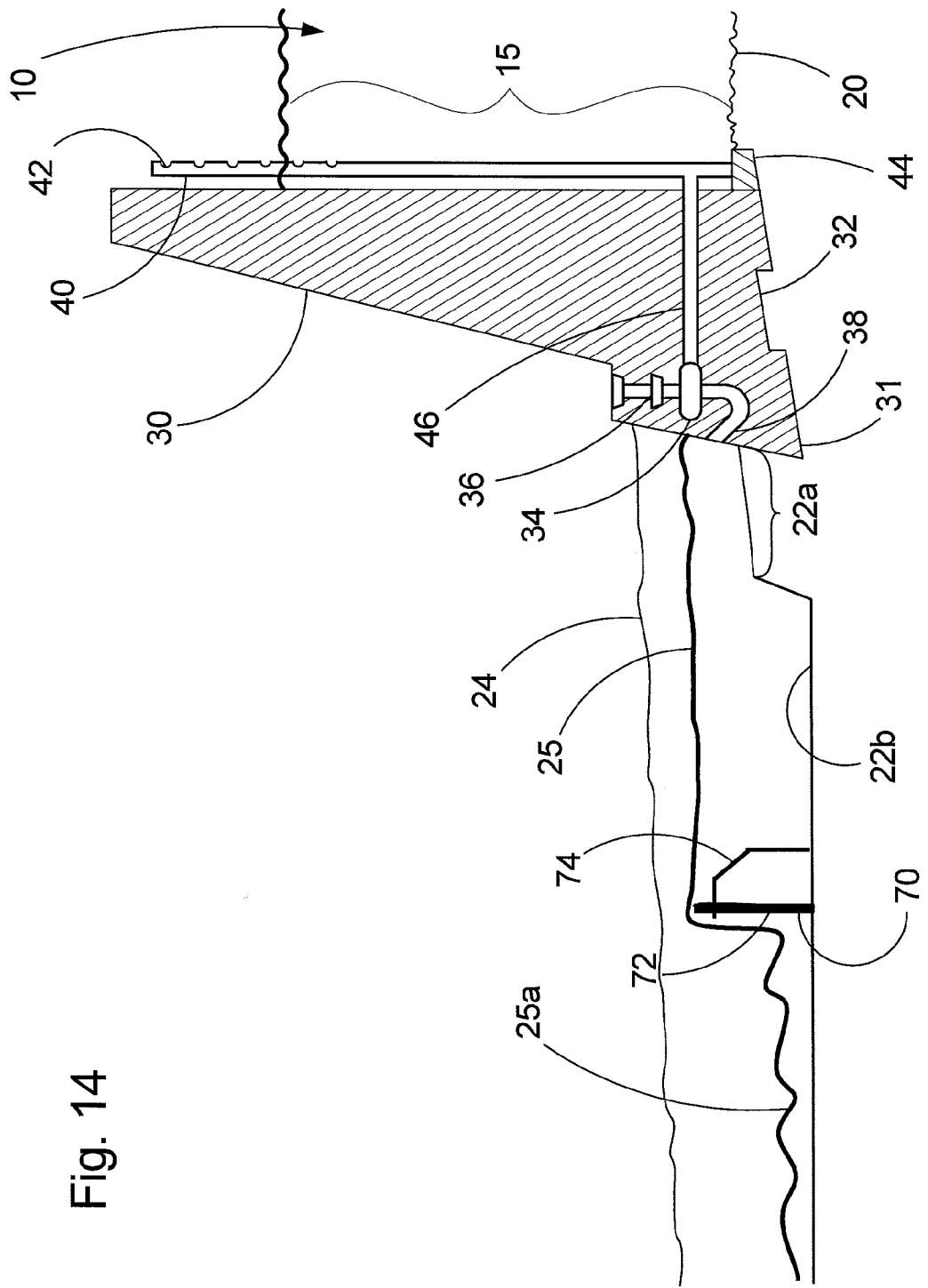
FIG. 14 is a cross-sectional side view of the hydroelectric dam installation from FIG. 2, shown provided with an exemplary embodiment of an adjustable multi-component weir according to the present invention, wherein the weir components are shown in a fully closed position.

Alternatively, the adjustable weir apparatus may comprise a constructed-in-place infrastructure provided with and cooperating with at least one upwardly extendable and/or swinging gate structure. FIGS. 11 through 14 illustrate an exemplary embodiment based on a coffre-type dam configuration provided with a reinforced concrete wall and framework 70 extending across the downstream waterway and conjoining the river banks 24. The concrete wall and framework 70 are buttressed and stabilized by a plurality of spaced-apart integrally conjoined braces 74. A plurality of controllably adjustable gates 72 are hingedly and/or extendibly engaged with the concrete wall and framework 70. A controlling device (not shown) is communicably interconnected with the each of the gates 72 to sealingly engage and disengage the gates 72 with the concrete walls and framework. During periods of high water flow rates into the impounded water reservoir 10, the gates 72 are adjusted into a fully open position as shown in FIGS. 11 and 12, to enable unrestricted flow of spent water 25 from the tailrace 38 through the tailrace pool 22a wherefrom it flows rapidly downstream. As the rates of water flow progressively decline during turbine idling or during extended periods of drought conditions, one or more of the gates 72 are partially closed as shown in FIG. 13 to create an increasing restriction on the flow of discharged spent water 25 thereby maintaining the water level sufficiently high to prevent air from backing into the turbine through the tailrace 38. FIG. 14 shows the gates 72 in a sealingly closed engagement with the concrete wall and framework 70 thereby causing the spent water 25 to flow over top of the framework 70 and gates 72 in order to maintain the spent water level 25 at the desired level within the tailrace pool area 22a during extended periods of drought or during turbine idling conditions. Those skilled in these arts will understand that during conditions when impounded water 10 levels decline as exemplified in FIGS. 13 and 14 or the turbines are in idling mode, the reduced levels of spent water 25a downstream of the bladder infrastructures 60, relative to the level of spent water 25 upstream to the bladder infrastructures 60, will proportionally increase the "effective net head" and thereby facilitate increased power generation during such conditions.

Figure 15:
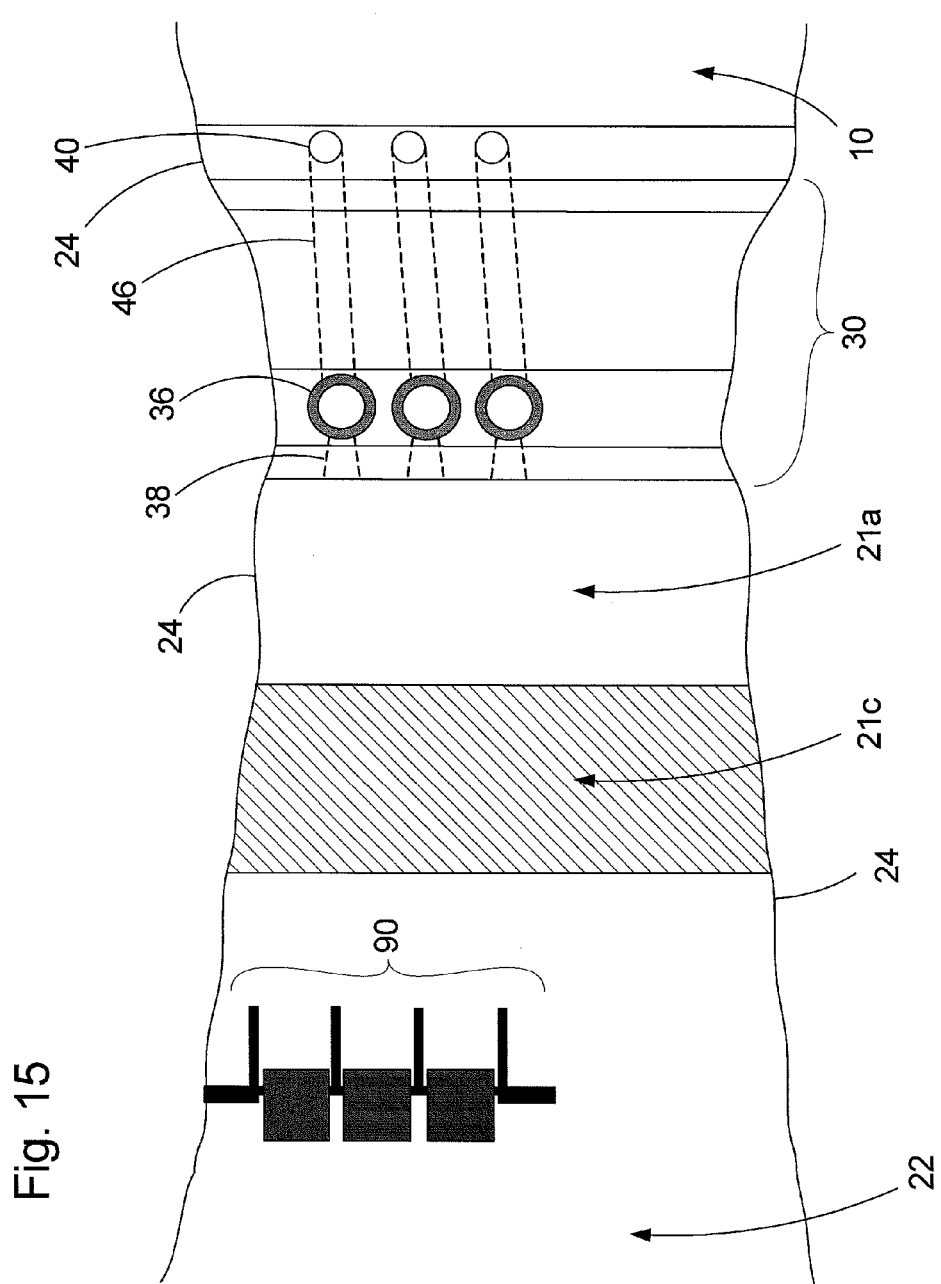
FIG. 15 is a plan view of another exemplary embodiment of the present invention showing an adjustable weir extending partially across a down-stream flow path from a hydroelectric dam installation exemplified in FIG. 1.
Figure 16:
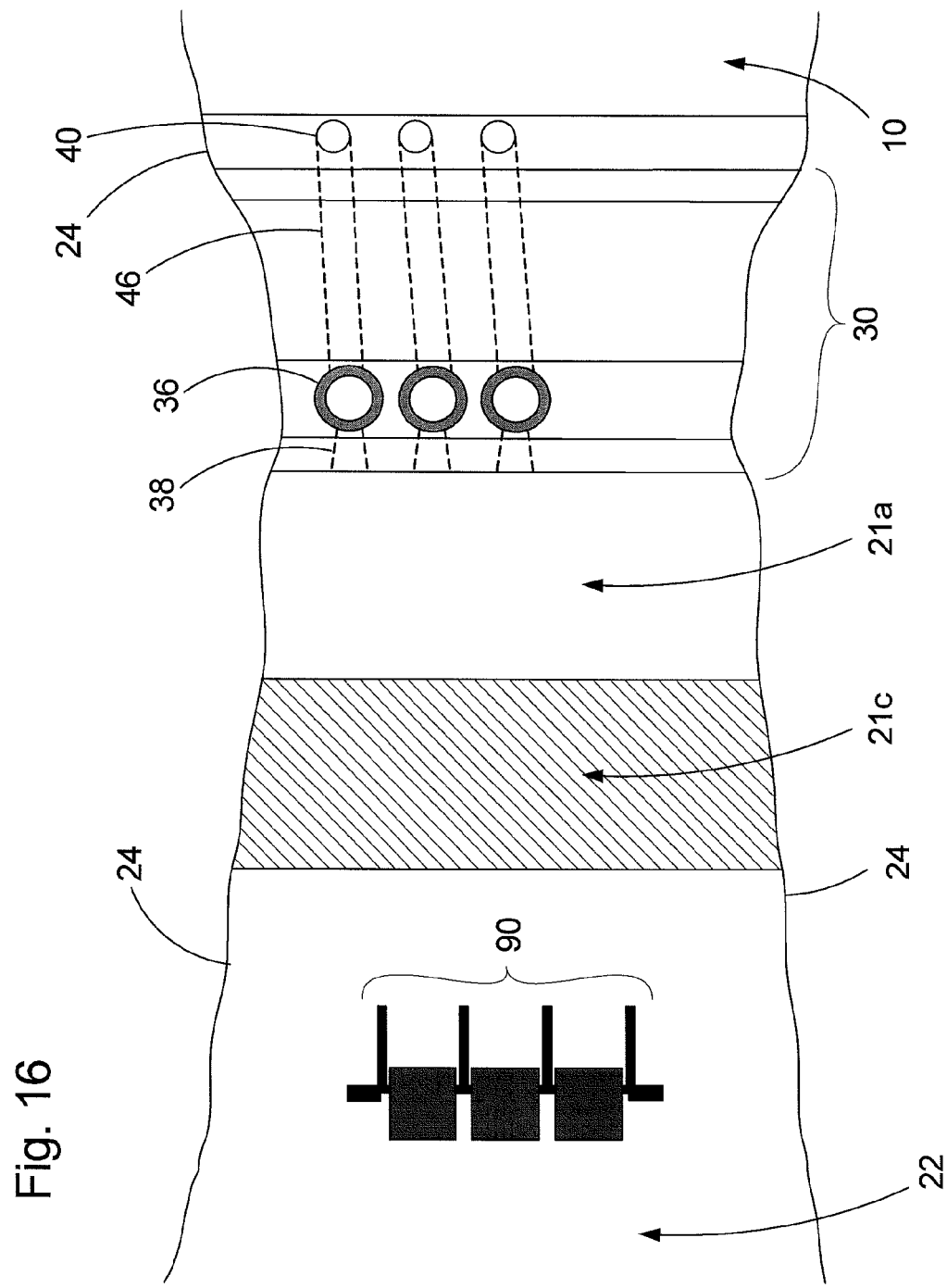
FIG. 16 is a plan view of another exemplary embodiment of the present invention showing an alternative configuration for extending an adjustable weir partially across a down-stream flow path from a hydroelectric dam installation exemplified in FIG. 1.

The exemplary embodiments of the present invention comprising controllably adjustable weirs are also amenable for installation in an unexcavated riverbed downstream of a tailrace pool 21a provided with an installed berm 21c comprising excavated materials, as shown in FIGS. 15 and 16. FIG. 15 shows a coffre-type adjustable weir device 90 connected to one shore and partially crossing the river. Alternatively, the adjustable weir device 90 can be positioned separated and free-standing from the river shores, for example as shown in FIG. 16, mid-stream in the path of the discharged spent water. The configurations and designs of the adjustable weirs of the present invention are configurable and manipulable to enable the use of the present invention with a variety of structural designs for hydroelectric installations and/or with a variety of environmental, geophysical and topographical sites, so that the attendant minimum and maximum discharge volumes of spent water can be controllable adjustable and manipulable suitable control devices interconnected to and cooperable with the adjustable weirs of the present invention. It is suitable that the control devices and mechanisms for the weir are located in controls housing structures on the shore(s) of the waterway, or alternatively, on the dam infrastructure. It is also suitable that routing of the mechanisms for controllably engaging and disengaging the gates of coffer-type adjustable weir devices of the present invention are positioned above the highest levels reached by the spent water 25 and are accessible by service staff above the water levels.

Figure 17:
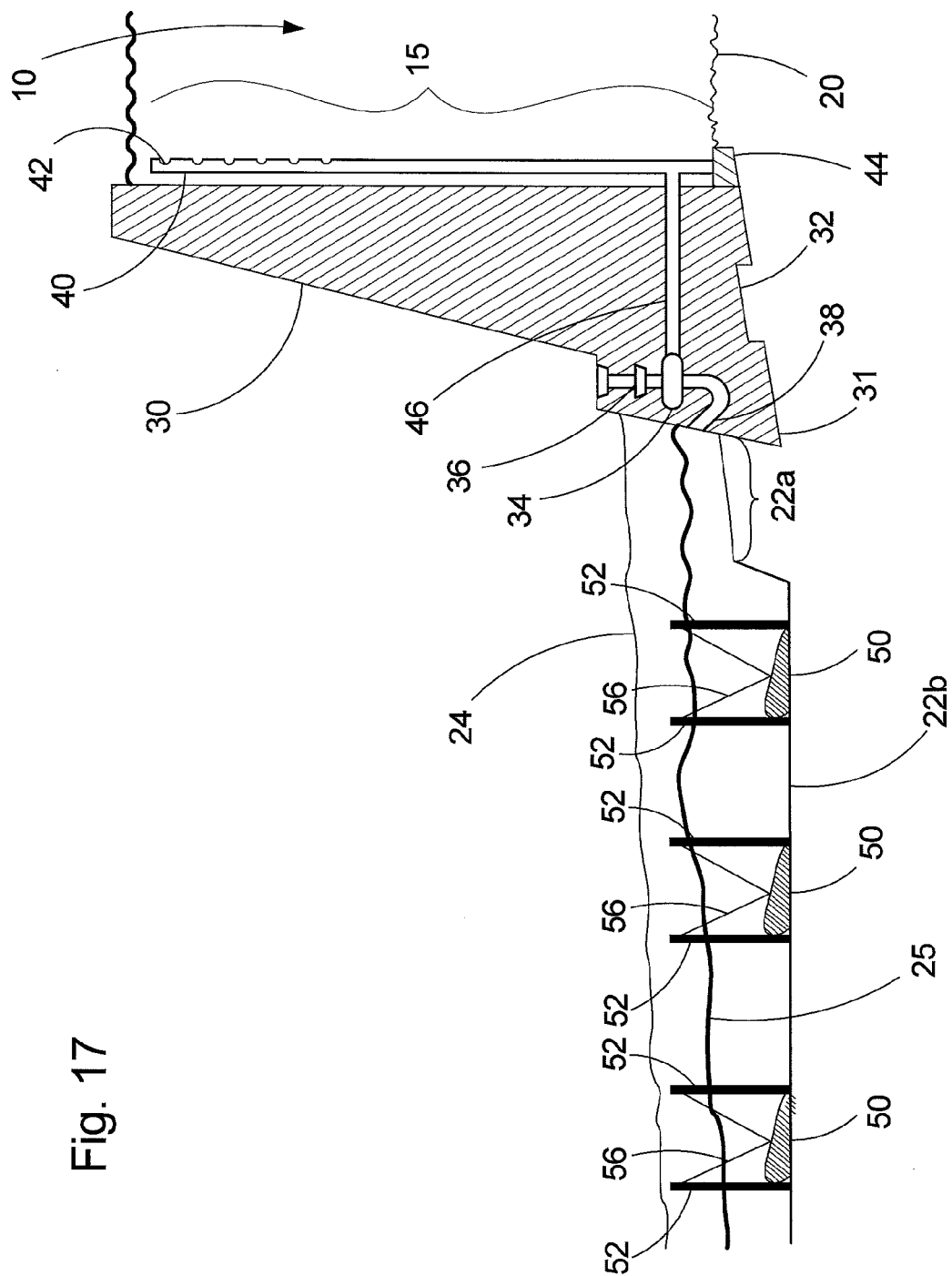
FIG. 17 is a cross-sectional side view of the hydroelectric dam installation from FIG. 2, shown provided with three sets of adjustable weirs positioned sequentially downstream from the dam installation.
Figure 18:
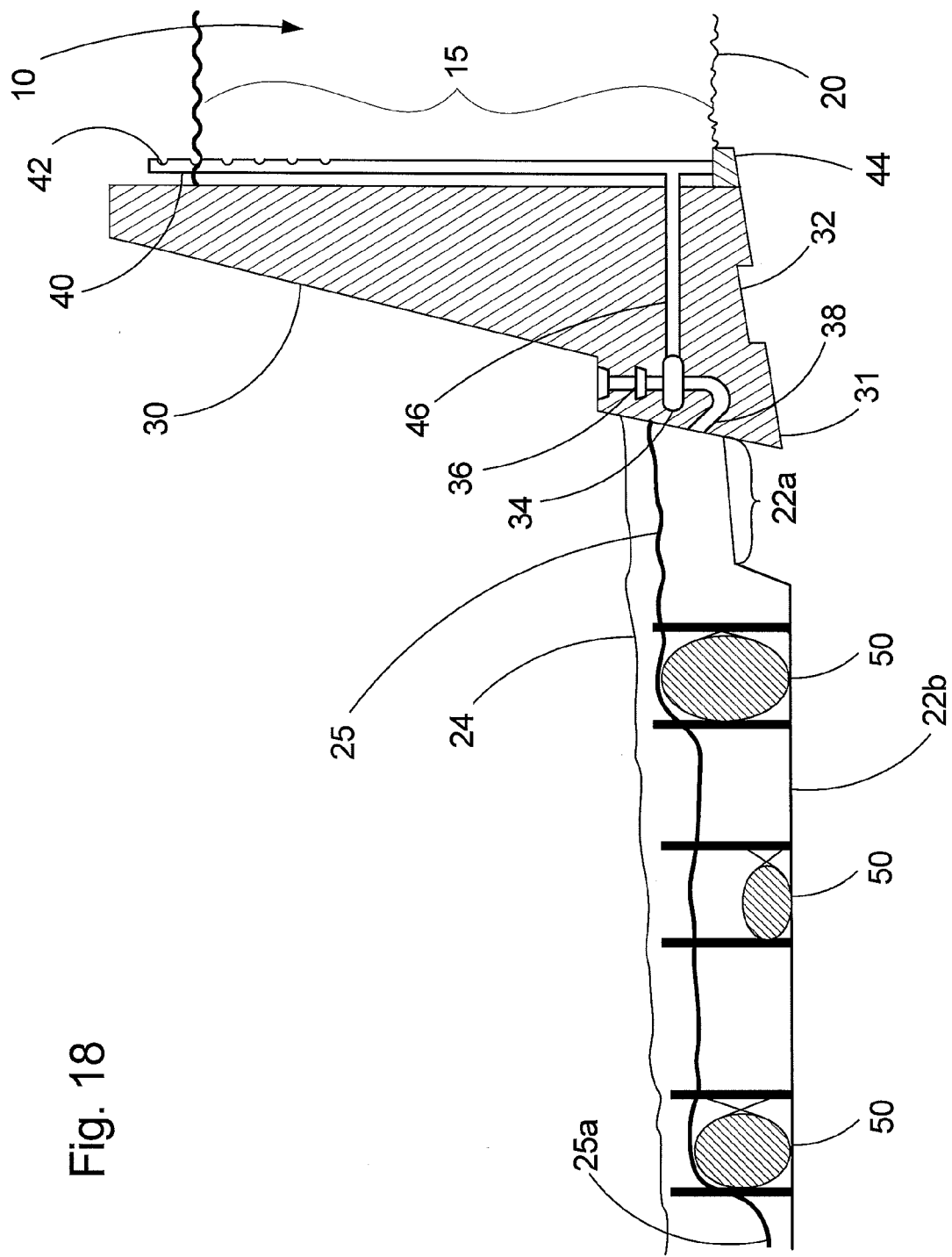
FIG. 18 is a cross-sectional side view of the exemplary embodiment from FIG. 17 shown with the first set of adjustable weirs downstream from the dam installation in a fully inflated mode, and the remaining sets of adjustable weirs in partially inflated modes.
Figure 19:
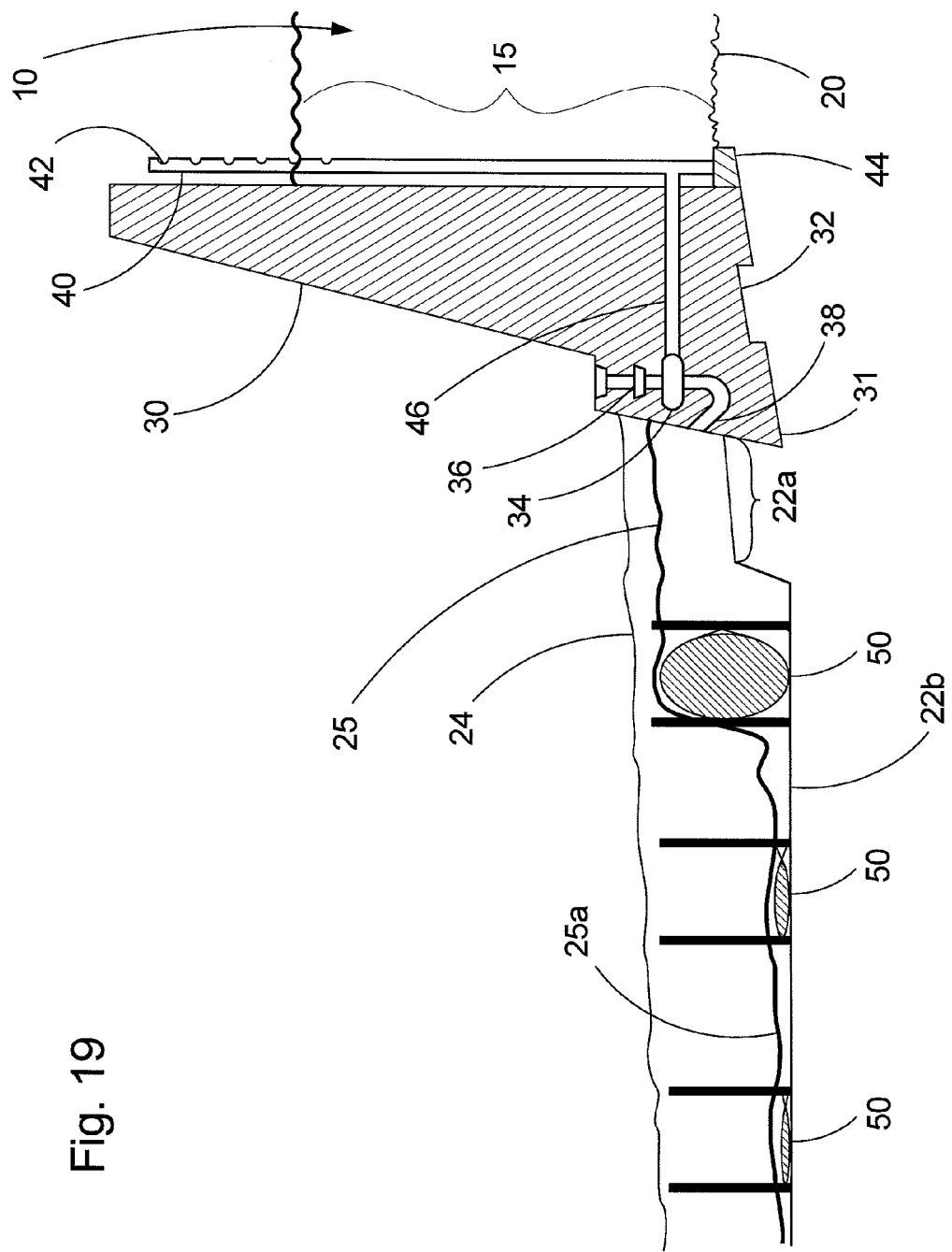
FIG. 19 is a cross-sectional side view of the exemplary embodiment from FIG. 17 shown with the first set of adjustable weirs downstream from the dam installation in a fully inflated mode, and the remaining sets of adjustable weirs in deflated modes.

Another exemplary embodiment of the present invention provides a series of controllably adjustable weirs placed sequentially downstream from a hydroelectric dam installation as shown in FIGS. 17-19 and are exemplified by the inflatable bladders 50, tethers 54, 56, and supports 52 from FIGS. 5-7. During seasonal periods when impounded water levels 10 are very high, the bladders 50 would be completely deflated as shown in FIG. 17 so as to present as small impediments as possible to the rapid egress of spent water 25 from the tailraces 38. As the level of impounded water 10 begins to decline as shown in FIG. 18, the bladders 50 may be selectively inflated to affect the retention and the rate of flow of spent water 25 from the tailrace pool area 22a. During seasonal periods when the level of upstream impounded water 10 is relatively low as shown in FIG. 19, it is suitable to fully inflate the bladders 50 in the first adjustable weir downstream from the dam, while the further downstream adjustable weirs are completely deflated. This combination will enable maintenance of a target level of spent water in the tailrace pool area 22a selected to prevent cavitation in the turbines 34, while providing a significant drop between the spent water level in the tailrace pool area 22a and the downstream area from the first adjustable weir to enable rapid egress of spent water 25a from the tailrace pool area upstream of the first adjustable weir. While FIGS. 17-19 show a series of three sequential sets of adjustable weirs, those skilled in these arts will understand that the numbers and placement of sequential sets of adjustable weirs are selectable depending on the requirements and restrictions imposed by the topography of the downstream waterway and its banks.

Another exemplary embodiment of the present invention provides a downstream placement of impediments that may potentially interfere with the rapid egress of spent water from hydroelectric dam installations. The impediments may be naturally occurring topographical elevations, boulder formations, large rocks and the like. It is to be noted, however, that those skilled in these arts will understand that this embodiment as described above is intended for retrofitting existing hydroelectric dam installations with for the purpose of intentionally providing downstream impediments to the flow of spent water downstream from the adjustable weir and excavation embodiments of the present invention.

While this invention has been described with respect to the combination and cooperation of the exemplary first and second embodiments, those skilled in this art will understand how to modify and adapt the systems, apparatus and methods disclosed herein for increasing the head height of hydroelectric dams and for controllably manipulating the level of discharged spent water adjacent dam tailraces. Furthermore, those skilled in these arts will understand that the first and second exemplary embodiments can be individually retrofitted, i.e., installed downstream to an existing hydroelectric generating dam for: (a) in the case of the first exemplary embodiment to increase the head height in order to increase the power-generating capacity of the dam, or (b) in the case of the second exemplary embodiment to enable controllable manipulation of the discharged spent water to maintain a selected minimum downstream water level adjacent the tailrace(s). It is also within the scope of the present invention to provide secondary excavations within primary excavations, wherein the primary excavations are provided for increasing the rates of spent water egress from tailrace pool areas while the secondary excavations are configured to contain therein the adjustable weir devices disclosed herein. The secondary excavations would enable the retraction of the adjustable weir devices to the level of the primary excavation so that they do not provide impediments and thus resistance to the egress of spent water during periods of high impounded water levels and throughput rates.

It is also within the scope of the present invention to provide: (a) excavations adjacent the tailrace pool areas of the hydroelectric dam installations, that are of sufficient depth to cause cavitation in turbines when rates of impounded water flow through the penstocks and turbines are seasonally or intentionally reduced, and (b) controllably adjustable weirs according to the exemplary embodiments disclosed herein, for manipulably maintaining spent water levels at desired levels adjacent the tailraces to prevent the occurrence of cavitation. Those skilled in these arts will understand the controllable imposition of stress on a hydroelectric dam installation by providing an excavation adjacent the tailrace pool area, while ameliorating the stress by controllably preventing turbine cavitation will result in increased power generation under such conditions.

Therefore, it is to be understood that various alterations and modifications can be made to the excavations, adjustable weir devices, apparatus and associated methods within the scope of this invention and are intended to be included herein. In view of numerous changes and variations that will be apparent to persons skilled in the art, the scope of the present invention is to be considered limited solely by the appended claims.

The invention claimed is:

1. A method for maximizing and/or maintaining an effective net head in a hydroelectric power-generating dam installed into a waterway having a natural riverbed and opposing riverbanks by controllably adjusting spent water levels in a tailrace pool area in the natural river bed adjacent to the hydroelectric power-generating dam, the method consisting of steps:
   providing a plurality of adjustable weir devices for controllably impeding egress of spent water from the tailrace pool area, said plurality of adjustable weir devices comprising a plurality of bladders tethered together to form a line of bladders, said bladders controllably inflatable and deflatable, said a plurality of adjustable weir devices installed into and across a downstream portion of the natural riverbed adjacent a distal end of the tailrace pool area;
   providing an apparatus for manipulating the plurality of adjustable weir devices, said apparatus having operative components for manipulating said devices to increase or decrease the egress of spent water from the tailrace pool area;
   providing a device for controllably manipulating the operative components of the apparatus for monitoring, recording and reporting the flow of spent water into and through the tailrace pool area, for calculating adjustments required to the rate of flow of spent water through the tailrace pool area, to maintain a selected level of effective net head of impounded water in the hydroelectric power-generating dam, and for communicatingly cooperating with the apparatus to manipulate the controllably adjustable weir device to controllably increase or decrease the impediment provided therewith to the egress of spent water from the tailrace pool area;
   monitoring, recording and reporting the flow of spent water into and through the tailrace pool area;
   calculating adjustments required to the rate of flow of spent water through the tailrace pool area, to maintain a selected level of effective net head of impounded water in the hydroelectric power-generating dam; and
   communicatingly cooperating with the apparatus to manipulate the plurality of adjustable weir devices to increase or decrease the egress of spent water from the tailrace pool area.

2. The method according to claim 1, wherein at least one excavation is provided in the natural riverbed adjacent a distal end of the tailrace pool area for installation therein of an adjustable weir device.

3. The method according to claim 1, wherein the plurality of adjustable weir devices comprises a plurality of bladders, said bladders tethered-together to form a line of bladders, said bladders controllably inflatable and deflatable.

4. The method according to claim 3, wherein at least one bladder is additionally tethered to at least one support structure imbedded into the waterway therefor.

5. The method according to claim 3, wherein each bladder from said plurality of bladders is separately controllably inflatable and deflatable.

6. The method according to claim 3, wherein said plurality of bladders is controllably inflatable by a compressed air supply.

7. The method according to claim 6, wherein said device is configured for manipulably controlling the supply of compressed air to said plurality of bladders.

8. The method according to claim 1, wherein the plurality of adjustable weir devices comprises a plurality of sets of stacked bladders, said sets of stacked bladders tethered-together to form a line of sets of stacked bladders, each set of stacked bladders controllably inflatable and deflatable.

9. The method according to claim 8, wherein each set of stacked bladders is additionally tethered to at least one support structure imbedded into the waterway therefor.

10. The method according to claim 8, wherein said plurality of bladders is controllably inflatable by a compressed air supply.

11. The method according to claim 10, wherein said device is configured for manipulably controlling the supply of compressed air to said plurality of bladders.

12. The method according to claim 1, wherein said plurality of adjustable weir devices comprises a plurality of gated structures wherein in each gated structure comprises:
   a framework;
   a gate element configured for sealing engagement with said framework; and
   cooperative elements cooperating with said framework and said gate element, said operative elements configured for sealingly engaging, partially disengaging, and completely disengaging said framework and said gate element, wherein
   the gated structure impedes the egress of spent water from the tailrace pool area when the framework and gate element are sealingly engaged, and partially impedes the egress of spent water from the tailrace pool area when the framework and gate element are partially disengaged.

13. The method according to claim 12, wherein the device for controllably manipulating the operative components of the apparatus is configured for communicating and cooperating with the apparatus for mechanically manipulating the plurality of adjustable weir devices therewith.

14. The method according to claim 12, wherein the device for controllably manipulating the operative components of the apparatus is configured for communicating and cooperating with the apparatus for hydraulically manipulating the plurality of adjustable weir devices therewith.

* * * * *